US011928879B2

(12) United States Patent
Bradley, III

(10) Patent No.: US 11,928,879 B2
(45) Date of Patent: Mar. 12, 2024

(54) DOCUMENT ANALYSIS USING MODEL INTERSECTIONS

(71) Applicant: AON RISK SERVICES, INC. OF MARYLAND, New York, NY (US)

(72) Inventor: John E. Bradley, III, Duvall, WA (US)

(73) Assignee: AON RISK SERVICES, INC. OF MARYLAND, New York, NY (US)

( * ) Notice: Subject to any disclaimer, the term of this patent is extended or adjusted under 35 U.S.C. 154(b) by 194 days.

(21) Appl. No.: 17/166,199

(22) Filed: Feb. 3, 2021

(65) Prior Publication Data

US 2022/0245378 A1 Aug. 4, 2022

(51) Int. Cl.
*G06F 16/00* (2019.01)
*G06F 16/93* (2019.01)
*G06F 18/21* (2023.01)
*G06V 30/414* (2022.01)
*G06V 30/416* (2022.01)

(52) U.S. Cl.
CPC ............ *G06V 30/416* (2022.01); *G06F 16/93* (2019.01); *G06F 18/217* (2023.01); *G06V 30/414* (2022.01); *G06F 2216/11* (2013.01)

(58) Field of Classification Search
None
See application file for complete search history.

(56) References Cited

U.S. PATENT DOCUMENTS

| 7,451,065 | B2 * | 11/2008 | Pednault | G06K 9/6282 |
| | | | | 703/2 |
| 10,133,791 | B1 * | 11/2018 | Chan | G06F 16/22 |
| 11,373,424 | B1 * | 6/2022 | Fleming | G06N 3/08 |
| 11,379,665 | B1 * | 7/2022 | Edmund | G06K 9/6256 |
| 2001/0037324 | A1 * | 11/2001 | Agrawal | G06F 16/355 |
| 2003/0126102 | A1 * | 7/2003 | Borthwick | G16Z 99/00 |
| | | | | 707/E17.079 |
| 2003/0176931 | A1 * | 9/2003 | Pednault | G06N 7/01 |
| | | | | 700/44 |
| 2005/0108652 | A1 * | 5/2005 | Beretich, Jr. | G06F 16/93 |
| | | | | 715/764 |
| 2005/0182755 | A1 * | 8/2005 | Tran | G06F 16/93 |
| 2007/0073748 | A1 * | 3/2007 | Barney | G06F 16/2228 |
| | | | | 707/E17.093 |
| 2008/0154848 | A1 * | 6/2008 | Haslam | G06F 16/382 |
| 2009/0030864 | A1 * | 1/2009 | Pednault | G06V 10/7625 |
| | | | | 706/45 |
| 2009/0132496 | A1 * | 5/2009 | Chen | G06F 16/36 |
| 2009/0132522 | A1 * | 5/2009 | Leino | G06F 16/904 |
| | | | | 707/999.005 |

(Continued)

OTHER PUBLICATIONS

International Preliminary Report on Patentability for PCT Application No. PCT/US22/14826, dated May 12, 2022, 11 pages.

*Primary Examiner* — Jean M Corrielus
(74) *Attorney, Agent, or Firm* — Lee & Hayes, P.C.

(57) ABSTRACT

Systems and methods for document analysis using model intersections are disclosed. Predictive models are built and trained to predict whether a given document is in class with respect to a given model. Each predictive model may be associated with a subcategory of an identified technology. Documents that are determined to be in class by multiple ones of the predictive models may be identified and grouped into subsets. These subsets of documents may be identified as relevant to the technology in question.

20 Claims, 9 Drawing Sheets

(56) References Cited

U.S. PATENT DOCUMENTS

| | | | | |
|---|---|---|---|---|
| 2010/0131513 | A1* | 5/2010 | Lundberg | G06Q 10/10 707/769 |
| 2010/0287148 | A1* | 11/2010 | Resnick | G06F 16/93 707/706 |
| 2011/0072024 | A1* | 3/2011 | Barney | G06F 16/951 707/E17.046 |
| 2011/0093449 | A1* | 4/2011 | Belenzon | G06N 7/005 707/E17.108 |
| 2012/0221580 | A1* | 8/2012 | Barney | G06F 16/26 707/748 |
| 2013/0173632 | A1* | 7/2013 | Birdwell | G06F 16/2246 707/743 |
| 2014/0067829 | A1* | 3/2014 | Barney | G06F 16/93 707/748 |
| 2015/0045420 | A1* | 2/2015 | Cahill, Jr. | A61Q 19/007 514/452 |
| 2016/0004768 | A1* | 1/2016 | Barney | G06F 16/3346 707/749 |
| 2016/0350294 | A1* | 12/2016 | Nefedov | G06F 16/367 |
| 2017/0139908 | A1* | 5/2017 | Chiu | G06F 16/3331 |
| 2018/0268015 | A1* | 9/2018 | Sugaberry | G06F 16/24575 |
| 2020/0117718 | A1* | 4/2020 | Lundberg | G06F 16/353 |
| 2020/0178052 | A1* | 6/2020 | Pattan | H04L 41/5051 |
| 2020/0202122 | A1* | 6/2020 | Goodsitt | G06N 3/044 |
| 2020/0356900 | A1* | 11/2020 | Briancon | G06N 20/20 |
| 2022/0180317 | A1* | 6/2022 | Andrews | G06F 40/279 |

\* cited by examiner

DOCUMENT ANALYSIS USING MODEL INTERSECTIONS

BACKGROUND

Determining the similarities, differences, and classification of information, such as a document, in association with other information can be valuable. However, quantifying attributes of document analysis, particularly in large corpuses of documents, is difficult. Described herein are improvements in technology and solutions to technical problems that can be used to, among other things, analyze documents utilizing modeling techniques.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
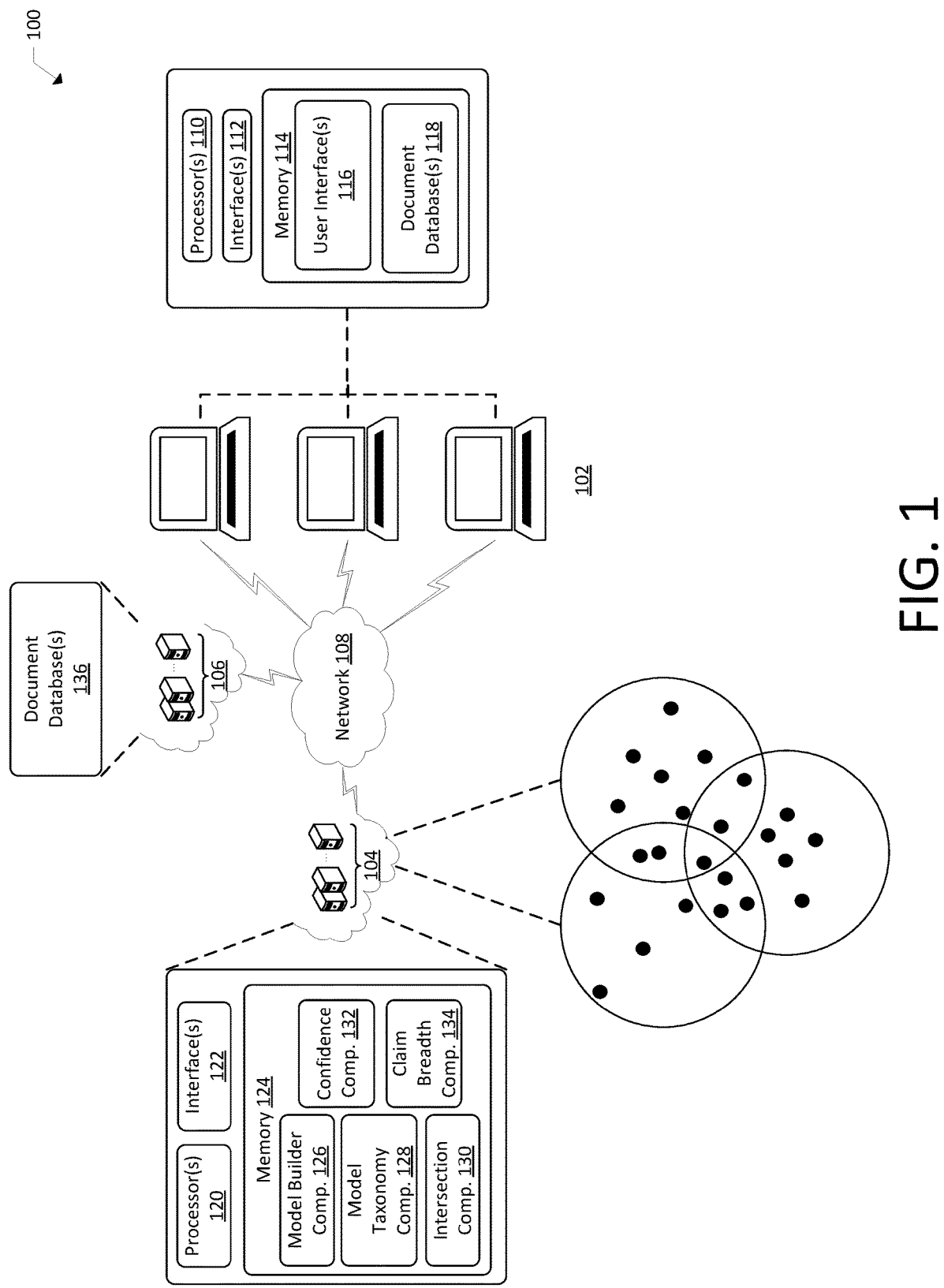
FIG. 1 illustrates a schematic diagram of an example environment for document analysis using model intersections.

Systems and methods for document analysis utilizing model intersections are disclosed. Take, for example, an entity that would find it beneficial to utilize a platform to determine which documents in a set of documents are in class for a given purpose and which of the documents in the set of documents are out of class for that given purpose. For example, an entity may desire to know which patents and/or patent applications are most relevant for patentability determinations, for infringement determinations, for asset acquisition purposes, for research and development purposes, for insurance purposes, etc. Generally, a user may search a database of such documents utilizing keyword searching. To gather a reasonable number of results that does not unduly limit the documents in those results, users may employ broad keyword searching and then review each document to determine whether each document should be considered in class or out of class for the purposes at hand. However, taking patents and patent applications as an example, the potential corpus of documents, even if looking just to patents and patent applications filed in the United States, easily numbers in the thousands if not tens of thousands or more. In light of this, a document analysis platform that is configured to intake documents, receive marginal user input to train classification models, and then to use those classification models to determine which documents in a set of documents are in class would be beneficial.

However, certain identified technologies may have disparate subject matter within subcategories of a given technology. In these examples, training of classification models may be difficult because positive training data associated with a given subcategory may result in a negative effect on another subcategory. In these examples, model training may be imprecise and lead to an analysis where irrelevant documents are included in the model results and/or where relevant documents are excluded from the model results. To assist in restricting these negative results, disclosed herein are system and processes for utilizing model intersections to improve document analysis. For example, a search query may be received to identify a set of documents that are relevant to that search query. The search query may include one or more keywords and/or phrases that define what is relevant to the search query.

Utilizing the document analysis platform described herein, a set of documents with keywords that correspond to the search query may be identified. Thereafter, one or more document classification models may be built and/or trained utilizing user input indicating whether given documents are in class or out of class. As will be described in more detail below, a user may utilize a user interface to view all or a portion of given documents and select elements on the user interface to identify the given documents as in class or out of class. Once a threshold number of documents have been marked as in class or out of class by a user, one or more classification models may be trained based on a positive training dataset of the documents marked as in class, and in some examples a negative training dataset of the documents marked as out of class. Thereafter, the trained classifications models may be utilized to predict which documents in the balance of the set of documents are in class or out of class. However, as noted above, for certain technologies, the results of these trained classification models may not be precise and may incorrectly include irrelevant documents and/or exclude relevant documents.

In these scenarios, instead of training a single model to predict document classification, the identified technology may be represented by two or more subcategories. The subcategories may represent a portion of the identified technology. Utilizing this methodology, a first classification model may be trained utilizing a positive and/or negative training dataset for a first subcategory of the identified technology, and a second classification model may be trained utilizing a positive and/or negative training dataset for a second subcategory of the identified technology. Additional models for additional subcategories of the identified technology may also be trained. Thereafter, each of the classification models may be utilized to determine subsets of documents that are in class for each of the models. Take for example a sample document set of 10,000 documents to be analyzed to determine which of those documents are in class with respect to an identified technology with three subcategories. A first classification model for a first subcategory may identify 500 of the 10,000 documents that are in class with respect to the first subcategory; a second classification model for a second subcategory may identify 750 of the 10,000 documents that are in class with respect to the second subcategory; and a third classification model for a third subcategory may identify 400 of the 10,000 documents that are in class with respect to the third subcategory.

Utilizing the model intersection techniques described herein, differing groups of the documents identified as in class may be generated as results. For example, a first group may include any document that is identified as in class by at least one of the classification models. A second group may include any document that is identified as in class by at least two of the classification models. A third group may include any document that is identified as in class by each of the classification models. As will be appreciated from the example provided above, for the first group, the number of in class documents will be more than the second group, and the number of in class documents in the second group will be more than the third group. In this way, the third group of documents indicated to be in class by each of the classification models represent those documents in the sample group of documents that are relevant to each subcategory of the identified technology. It should be appreciated that other grouping of documents are also included with respect to intersections of model results. The results of these model intersection analyses may be provided to a computing device associated with the search query. For example, the in class documents in some or all of the groupings may be displayed to a user of the computing device, and/or identified of the documents and/or the groupings may be provided.

In some examples, a user interface may be utilized to display a representation of the model intersections described herein. By way of example, the representation of the model intersections may include a diagram with identifiers of the models and identifiers of the documents as predicted by those models as in or out of class. For example, the identifiers of the models may include circles or other shapes showing boundaries of what the models have been trained to predict as in class. The identifiers of the documents may include points or other representations positioned within one or more of the model identifiers. The positions of the document identifiers may represent relevance of the document to the subcategory and/or subcategories associated with the classification models.

The determination of whether a given document is in class or out of class may be based at least in part on a confidence score associated with the prediction of that document as in class by a given classification model. For example, a confidence score threshold may be set, such as to 0.90, and documents predicted as in class at a confidence of at least 0.90 will be considered in class, while the remainder of the analyzed documents will be considered out of class. In certain examples, all of the classification models associated with the subcategories of the identified technology may have the same confidence score threshold. In these examples, the identifiers of the models as displayed on the user interface may be equal in size. However, in other examples, the confidence score thresholds may differ from each other. For example, a classification model corresponding to a first subcategory may have a threshold confidence score of 0.90, while a model corresponding to a second subcategory may have a threshold confidence score of 0.80, and a model corresponding to a third subcategory may have a threshold confidence score of 0.97. In these examples, the confidence score thresholds may be dynamic and may alter how many documents are determined to be in class by the model intersection groups described herein. In this way, users and/or the systems described herein may increase or decrease the number of resulting in class documents by changing the confidence score thresholds associated with the models.

In addition to the above, the user interfaces described herein may be utilized to present keywords indicated to be most relevant to the trained classification models for positive training datasets and/or negative training datasets. By so doing, a user may visualize the keywords and determine whether the group of keywords is too inclusive (e.g., includes keywords that are not relevant) or too exclusive (e.g., does not include keywords that are relevant). Utilizing this functionality, additional training of the models may be performed and/or the confidence score thresholds of the models may be altered.

In addition to utilizing model intersections to determine the relevance of documents for one or more purposes, additional factors may be applied to determine whether given documents should be determined relevant and/or highlighted. By way of example, one factor to be applied may be a claim breadth score, particularly in instances where the documents in question represent patents and/or patent applications. As will be described more fully herein, a claims section of the documents may be analyzed to determine a breadth of the claims, with documents having broad claims receiving a more favorable score and documents having narrow claims receiving a less favorable score. Additional factors other than claim breadth may be analyzed and applied as well to score documents. In these examples, the model intersection analyses described herein may be utilized to identify the groupings of documents described herein. Thereafter, the resulting documents may be analyzed for the one or more additional factors to determine which of those documents should be identified as responsive to a given search query and/or which of those document should be highlighted or otherwise emphasized.

Additionally, or alternatively, the document analysis platform described herein may include a model taxonomy of the classification models that have been trained and/or utilized. This model taxonomy may be utilized to show relationships between models and/or to provide search-by-model functionality. Indicators of the model intersection analyses described herein may be included in the model taxonomy and may be utilized for subsequent model analyses. These indicators may include visual indicators between nodes of the model taxonomy, where each node represents a classification model. Lines or otherwise connectors between nodes may be provided to show which models were utilized to develop document groupings for the technology at issue.

The document analysis platform, as described herein, may be hosted or otherwise utilized by a system that may be connected to one or more other systems and/or devices. For example, the system may be configured to receive, over a network, the documents from a third-party system that includes a document database that stores data representing the documents. The platform may also be configured to receive, over the network, data representing the documents from one or more client devices, which may be computing devices configured to access the Internet, display information, and receive user input. The client devices may include the one or more user interfaces described herein and/or may include an application configured to instruct processors of the client devices to display user interfaces as provided by the system associated with the document analysis platform, such as via an application residing on memory of the client devices and/or via an Internet browser. The client devices may receive user input, such as user input from the user interfaces, and may provide user input data corresponding to that user input to the system associated with the document analysis platform. The system may utilize that user input data for the various operations described herein. The model building component and the model library component, as described herein, may be stored in memory of the system and may be utilized to train classification model, predict document classification, and search for models, for example.

As described herein, the document analysis platform may be configured to receive user input data associated with classification of given documents. To train the classification models utilizing this user input data, the document analysis platform may perform one or more operations. In some examples, the platform may generate a positive training dataset indicating in class keywords associated with the documents marked in class by a user. For example, the platform may determine one or more keywords associated with a given document that represent the subject matter of that document. This may be performed utilizing one or more document processing techniques, such as term frequency inverse document frequency techniques, for example. The platform may also generate a negative training dataset indicating keywords from the documents marked out of class by the user input. Each of these training datasets may then be utilized to train the classification model such that the classification model is configured to determine whether a given document has keywords that are more similar to the in class keywords than to the out of class keywords. In other examples, instead of or in addition to generating training datasets based on keywords, the platform may determine a vector for a given document. The vector may be associated with a coordinate system and may represent the subject matter of the document in the form of a vector. Vectors may be generated for the documents labeled in class and for the documents labeled out of class. The classification model may be trained to determine whether a vector representation of a given document is closer to the in class vectors than to the out of class vectors in the coordinate system. Techniques to generate vectors representing documents may include vectorization techniques such as Doc2Vec, or other similar techniques.

Additionally, or alternatively, documents representations may include a method that takes a document and turns it into a vector form as a list of floating point numbers based at least in part on the document's text contents. This vector form may be called an embedding. This embedding may be used to calculate distance, and therefore similarity, between documents. These embeddings could be used in association with the classification models in addition to or in replacement of the keyword and/or vectors described above. The embeddings may be utilized to create thematic groups of documents with a set. The set of documents can be some keyword, CPC, owner(s), etc., and the result may be a visual display of document groups (e.g., clusters) that share similar themes. There may be a degree of supervision in the clustering process that may allow for some human control over which documents are grouped in which clusters.

In further examples, the classification models may utilize transfer learning. In these examples, a general-purpose model may be generated and/or received, and each specific classification model may use the general purpose model as a starting point. Rather than having to train a classification model from scratch, the model would be fine-tuned from the general purpose model for whatever that model has not already been trained for with respect to the specific scenario being modeled. These transfer learning techniques may include the user of ULMFit, BERT, ELMo, and T5, among others.

In addition to the techniques for training the classification models described above, the classification models may also be trained and/or organized based at least in part on classifications of the documents. For example, when the documents are patents and patent applications, a predetermined classification system may be established for classifying the subject matter of a given document. The classification system may be determined by the platform, by one or more users, and/or by a third party. For example, patents and patent application may be associated with a predefined classification system such as the Cooperative Patent Classification (CPC) system. The CPC system employs CPC codes that correspond to differing subject matter, as described in more detail herein. The CPC codes for a given document may be identified and the categories associated with those codes may be determined. A user interface may be presented to the user that presents the determined categories and allows a user to select which categories the user finds in class for a given purpose. The selected categories may be utilized as a feature for training the classification models. Additionally, or alternatively, the platform may determine the CPC codes for documents marked as in class and may train the classification models to compare those CPC codes with the CPC codes associated with the documents to be analyzed to determine classification.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example architecture 100 for a document analysis architecture. The architecture 100 may include, for example, one or more client-side devices 102, also described herein as electronic devices 102, a document analysis system 104 associated with a document analysis platform, and/or a document database system 106 associated with one or more document databases 136. Some or all of the devices and systems may be configured to communicate with each other via a network 108.

The electronic devices 102 may include components such as, for example, one or more processors 110, one or more network interfaces 112, and/or memory 114. The memory 114 may include components such as, for example, one or more user interfaces 116 and/or one or more document databases 118. As shown in FIG. 1, the electronic devices 102 may include, for example, a computing device, a mobile phone, a tablet, a laptop, and/or one or more servers. The components of the electronic device 102 will be described below by way of example. It should be understood that the example provided herein is illustrative, and should not be considered the exclusive example of the components of the electronic device 102.

By way of example, the user interface(s) 116 may include one or more of the user interfaces described elsewhere herein, such as the user interface corresponding to a model builder user interface, a document summary user interface, a full document user interface, user interfaces utilized for document voting, confidence value user interfaces, keyword user interfaces, search query user interfaces, model taxonomy user interfaces, etc. It should be understood that while the user interfaces 116 are depicted as being a component of the memory 114 of the client-side devices 102, the user interfaces 116 may additionally or alternatively be associated with the document analysis system 104. The user interfaces 116 may be configured to display information associated with the document analysis platform and to receive user input associated with the document analysis platform. The document databases 118 of the client-side device 102, and/or the document databases 136 of the document database system 106 may include data corresponding to documents that a user may desire to be analyzed using the document analysis platform. Those documents may include, for example, patents and patent applications, and/or the documents may include non-patent documents. The documents may be stored with respect to the document databases 136 of the document database system 106 and/or the documents may be stored with respect to the document databases 118 of the client-side devices 102.

The document analysis system 104 may include one or more components such as, for example, one or more processors 120, one or more network interfaces 122, and/or memory 124. The memory 124 may include one or more components such as, for example, a model builder component 126, a model taxonomy component 128, an intersection component 130, a confidence component 132, and/or a claim breadth component 134. The model builder component 126 may be configured to receive user input data as described herein for labelling documents as in class or out of class. The model builder component 126 may also be configured to utilize the user input data, as well as other data associated with a document set in question, to train classification models for determining the classification of a given document. The model builder component 126 may also be configured to utilize the trained classification models to predict document classification and to display results of the use of the classification models. The model taxonomy component 128 may be configured to generate and utilize a model taxonomy including the trained classification models. The model taxonomy component 128 may also be configured to receive user input data representing user queries for use of classification models and to display search results to the search query indicating one or more models associated with the search query. The additional components of the client-side devices 102 and/or the document analysis system 104 are described below by way of example.

For example, utilizing the document analysis platform described herein, a set of documents with keywords that correspond to a search query may be identified. Those documents may be identified from the document databases 136, 118. Thereafter, one or more document classification models may be built and/or trained utilizing the model builder component 126 utilizing user input indicating whether given documents are in class or out of class. A user may utilize a user interface to view all or a portion of given documents and select elements on the user interface 116 to identify the given documents as in class or out of class. Once a threshold number of documents have been marked as in class or out of class by a user, one or more classification models may be trained based on a positive training dataset of the documents marked as in class, and in some examples a negative training dataset of the documents marked as out of class. Thereafter, the trained classifications models may be utilized to predict which documents in the balance of the set of documents are in class or out of class. However, as noted herein, for certain technologies, the results of these trained classification models may not be precise and may incorrectly include irrelevant documents and/or exclude relevant documents.

In these scenarios, instead of training a single model to predict document classification, the identified technology may be represented by two or more subcategories. The intersection component 130 may be configured to identify the subcategories and/or to receive user input indicating the subcategories. The subcategories may represent a portion of the identified technology. Utilizing this methodology, a first classification model may be trained utilizing a positive and/or negative training dataset for a first subcategory of the identified technology, and a second classification model may be trained utilizing a positive and/or negative training dataset for a second subcategory of the identified technology. Additional models for additional subcategories of the identified technology may also be trained. Thereafter, each of the classification models may be utilized to determine, by the intersection component 130, subsets of documents that are in class for each of the models. Take for example a sample document set of 10,000 documents to be analyzed to determine which of those documents are in class with respect to an identified technology with three subcategories. A first classification model for a first subcategory may identify 500 of the 10,000 documents that are in class with respect to the first subcategory; a second classification model for a second subcategory may identify 750 of the 10,000 documents that are in class with respect to the second subcategory; and a third classification model for a third subcategory may identify 400 of the 10,000 documents that are in class with respect to the third subcategory.

Utilizing the model intersection component 130, differing groups of the documents identified as in class may be generated as results. For example, a first group may include any document that is identified as in class by at least one of the classification models. A second group may include any document that is identified as in class by at least two of the classification models. A third group may include any document that is identified as in class by each of the classification models. As will be appreciated from the example provided above, for the first group, the number of in class documents will be more than the second group, and the number of in class documents in the second group will be more than the third group. In this way, the third group of documents indicated to be in class by each of the classification models represent those documents in the sample group of documents that are relevant to each subcategory of the identified technology. The results of these model intersection analyses may be provided to a computing device, such as the client-side device 102, associated with the search query. For example, the in class documents in some or all of the groupings may be displayed to a user of the computing device, and/or identified of the documents and/or the groupings may be provided.

In some examples, a user interface 116 may be utilized to display a representation of the model intersections described herein. By way of example, the representation of the model intersections may include a diagram with identifiers of the models and identifiers of the documents as predicted by those models as in or out of class. For example, the identifiers of the models may include circles or other shapes showing boundaries of what the models have been trained to predict as in class. The identifiers of the documents may include points or other representations positioned within one or more of the model identifiers. The positions of the document identifiers may represent relevance of the document to the subcategory and/or subcategories associated with the classification models.

The determination of whether a given document is in class or out of class may be based at least in part on a confidence score associated with the prediction of that document as in class by a given classification model. For example, a confidence score threshold may be set, utilizing the confidence component 132, such as 0.90, and documents predicted as in class at a confidence of at least 0.90 will be considered in class, while the remainder of the analyzed documents will be considered out of class. In certain examples, all of the classification models associated with the subcategories of the identified technology may have the same confidence score threshold. In these examples, the identifiers of the models as displayed on the user interface may be equal in size. However, in other examples, the confidence score thresholds may differ from each other. For example, a classification model corresponding to a first subcategory may have a threshold confidence score of 0.90, while a model corresponding to a second subcategory may have a threshold confidence score of 0.80, and a model corresponding to a third subcategory may have a threshold confidence score of 0.97. In these examples, the confidence score thresholds may be dynamic and may alter how many documents are determined to be in class by the model intersection groups described herein. In this way, users and/or the systems described herein may increase or decrease the number of resulting in class documents by changing the confidence score thresholds utilizing the confidence component 132 associated with the models.

In addition to the above, the user interfaces 116 described herein may be utilized to present keywords indicated to be most relevant to the trained classification models for positive training datasets and/or negative training datasets. By so doing, a user may visualize the keywords and determine whether the group of keywords is too inclusive (e.g., includes keywords that are not relevant) or too exclusive (e.g., does not include keywords that are relevant). Utilizing this functionality, additional training of the models may be performed and/or the confidence score thresholds of the models may be altered.

In addition to utilizing model intersections to determine the relevance of documents for one or more purposes, additional factors may be applied to determine whether given documents should be determined relevant and/or highlighted. By way of example, one factor to be applied may be a claim breadth score, particularly in instances where the documents in question represent patents and/or patent applications. In these examples, the claim breadth component 134 may be configured to analyze a claims section of the documents to determine a breadth of the claims, with documents having broad claims receiving a more favorable score and documents having narrow claims receiving a less favorable score. Additional factors other than claim breadth may be analyzed and applied as well to score documents. In these examples, the model intersection analyses described herein may be utilized to identify the groupings of documents described herein. Thereafter, the resulting documents may be analyzed for the one or more additional factors to determine which of those documents should be identified as responsive to a given search query and/or which of those document should be highlighted or otherwise emphasized.

The claim breadth component 134 may utilize processes described herein to determine claim breadth scores. For example, in some instances, documents are pre-processed to generate one or more processed document portions for each of the documents. For instance, a processed document may refer to the document following pre-processing. In some instances, the pre-processing itself may divide a document into two or more processed document portions. For example, when analyzing text containing patent claims, the document may be divided into document portions (e.g., individual patent claims) at locations following a period and preceding a numeral. In some instances, each portion of the document is associated with the unique document identification number of the source document. For example, each patent claim from a patent would be associated with the patent number. The processed document portions include a portion of the text from the source document. The specific pre-processing techniques may include parsing text to separate words, removing stop words, removing duplicate words, and removing punctuation. In some instances, some or all of the stop words may be specific to a document classification of the documents. For example, if all of the documents are associated with the same patent classification, and there are specific stop words for that classification, then those specific stop words may be used instead of or in addition to general stop words. In some instances, pre-processing may include additional pre-processing techniques, such as replacing abbreviations and/or acronyms with the corresponding full words.

Thereafter, a word count is generated for each of the document portions (e.g., processed or unprocessed document portions). For instance, a word count for each document portion may be generated by counting a number of separate words in the respective document portions. In some instances, this may be performed after pre-processing so that stop words and duplicate words are omitted from the count. A word count performed after removal of duplicate words is referred to as a word count of unique words. In some instances, the word count generated for each document portion (e.g., patent claim includes is an integer (e.g., one, two, three, etc.).

Then, a referential word count is identified. In some instances, the referential word count is a number, but not necessarily an integer. The referential word count may be based on a characteristic derived from the word counts of the individual document portions under analysis. For example, the referential word count may be the word count of the document portion having a largest word count out of all the analyzed document portions. For another example, the referential word count maybe the word count of the document portion having a shortest word count out of all the analyzed document portions.

In some instances, other characteristics may also be used to generate the referential word count such as the average or median word count of the analyzed document portions. For example, if the analyzed document portions are patent claims, then the referential word count may be the word count of the longest patent claim, the word count of the shortest patent claim, the average word count of all the analyzed patent claims, the median word count of all the analyzed patent claims, or some other metric. In some instances, the referential word count is the same for all document portions analyzed together in the same corpus. However, in some instances, due to the different characteristics of each corpus of documents analyzed, the referential word count will be different in different analyses.

Additionally, word count ratios are calculated for the document portions. For instance, a word count ratio may be calculated for each document portion by dividing the referential word count by the word count for a respective document portion. Thus, in some instances, each analyzed document portion will be associated with a word count ratio. In some instances, the numerator is the same for each document portion in a given corpus, but the denominator is different depending on the individual word count of that document portion. For example, if the word count for a given document portion is 25 and the referential word count is 72 (e.g., the longest word count of all the analyzed document portions), then the word count ratio for that particular document portion is 72/25 or 2.88.

Then, a word frequency is determined for individual words. For instance, a corpus-based word frequency may be determined for each word included in any of the document portions. In some instances, the word frequency is specific to the word and not the document portion in which the word is found. Word frequency may be thought of as a measure of how common a particular word is throughout all of the analyzed document portions. In some instances, word frequency is determined by counting how many times a word appears in all of the analyzed document portions. Thus, word frequency represents the number of instances that a word is found across the entire set of content under analysis prior to removal of duplicate words. For example, if the corpus of documents being analyzed includes 1000 patents, those patents each have on average 20 patent claims, then there will be 20,000 document portions under analysis. The number of times a given word such as "machine" appears throughout all 20,000 document portions is that word's frequency. As such, words that are common in a particular corpus will have higher word frequency values and words that are uncommon in the particular corpus will have lower word frequency values. Thus, at this point, each document portion is associated with a word count and each word (which necessarily includes the words in each document portion) is associated with a word frequency.

Thereafter, a commonness score is generated for the document portions. For instance, each document portion may be associated with its own commonness score. The commonness score is based on the frequency that the individual words in a particular document portion are found throughout the entire corpus of document portions under analysis. Thus, the commonness score for a document portion is based on the word frequencies of the words in that document portion. In some instances, the commonness score for a processed document portion is based on the square root of the sum of the squares of the inverse of the word frequency for each one of the separate words in that processed document portion. For instance, the commonness score (cs) for a document portion having words 1 to n, each with an associated word frequency represented by $wf^1$ to $wf^n$, may be calculated by the following equation:

$$\text{commonness score} = \sqrt{\left(\left(\frac{1}{wf^1}\right)^2 + \left(\frac{1}{wf^2}\right)^2 + \ldots + \left(\frac{1}{wf^n}\right)^2\right) \times 100} \quad (1)$$

With this calculation, a document portion that has more common words will receive a lower commonness score, and a document portion that has more uncommon words will receive a higher commonness score. In this manner, the commonness score represents an underlying assumption or premise that patent claims with more common words tend to be broader than claims with less common words. This may not always be the case, but is a useful generalization for automatic document analysis.

Then, a reference commonness score is identified. In some instances, the reference commonness score is identified as the highest commonness score out of all of the processed document portions undergoing analysis. The commonness scores for each of the document portions maybe calculated, sorted, and then the highest of those is stored as the highest commonness score. This represents the score of the document portion that is the "most common" based on the frequency and number of words included in that document portion. As such, every other document portion will have a commonness score that is lower than the highest commonness score.

The system then calculates commonness score ratios for the processed document portions. For instance, commonness score ratios may be calculated by dividing the reference commonness score (e.g., the highest commonness score) by the commonness score for individual ones of the processed document portions. In some instances, the document portion with the highest commonness score (the "most uncommon" words) has a commonness score ratio of 1 (i.e., it is divided by its own commonness score value). Additionally, a document portion with half the highest commonness score (fewer "uncommon" words and more "common" words) has a commonness score ratio of 2. As the set of words in a document portion become more "common" the commonness score ratio increase. As such, a higher commonness score ratio indicates more "common" or frequent words in a processed document portion. In the context of patent claims, commonness ratio represents an underlying assumption or premise that claims with fewer unique words tend to be broader than claims with more unique words, and thus, the commonness score ratio increases as the words in claim become more common.

Then, breadth scores for the document portions are calculated using the word count ratios and the commonness score ratios. For instance, the breadth scores may be calculated by taking a square root of the sum of the square of the word count ratio (wcr) and the square of the commonness score ratio (csr) for the individual ones of the processed document portions. In some instances, the relative weights of the word count ratio and the commonness score may be normalized. One technique for normalization is to set the highest respective values for both word count ratio and commonness score ratio to 100. If, for example, the highest word count ratio is h-wcr, then all of the wcr for the corpus will be multiplied by 100/h-wcr. Similar, in some instances, normalization may be performed for the commonness score ratio using the highest commonness score ratio (h-csr). Of course, normalization values other than 100 may be used, such as 1000, 500, 50, 10, or the like. Both are numbers, but the relative effect on a breadth score may not directly correspond to the respective numerical values. For example, a word count ratio of 10 may have more or less impact on ultimate breadth than a commonness score ratio of 10. However, without normalization both contribute equally to the breadth score. As such, the word count ratio may be weighted by a first normalization value K (e.g. 100/h-wcr) and the commonness score ratio may be weighted by a second normalization value L (e.g., 100/h-csr). When written in an equation:

$$\text{Breadth Score} = \sqrt{K(wcr^2) + L(csr^2)} \quad (2)$$

Thus, each document portion may be assigned its own breadth score. The breadth scores may be thought of as measuring the breadth of the document portions because the breadth scores are based on measures of word count and word commonness. This technique for determining a breadth score also moderates each of the underlying assumptions or premises behind the word count ratio and the commonness ratio. For example, if a patent claim is relatively shorter, but uses very uncommon terms, a patent practitioner might still consider the claim to be narrow due to the restrictive language in the claim. By defining a breadth score based on these two underlying assumptions, even shorter claims may be ranked not quite as broad if they use terms that are considered limiting or distinctive within a class in which an ontology is well developed.

Additionally, overall breadth scores for the documents may be calculated. For instance, an overall breadth score may be calculated for each document being analyzed using the breadth scores for the document portions from the respective document. In some examples, calculating the overall breadth score for a document can include taking an average of the breadth score(s) for one or more document portions within the document. In some instances, calculating an overall breadth score for a document can include taking the highest, the lowest, the range, the average, median, mean or the like of the breadth score(s) of the one or more document portions and producing a composite score or preserving them individually. Additionally, in some instances, one or more of the breadth scores for one or more of the document portions for a document may be given more weight than one or more other breadth scores for one or more other document portions. For instance, if a document is a patent, breadth score(s) of independent claims(s) (e.g., the broadest independent claim) of the patent may be given more weight when determining the overall breadth score than breadth score(s) of dependent claim(s) within the patent.

In some instances, when documents include patents and/or published applications, one or more rules may be utilized for calculating the overall breadth scores for the patents and/or published applications. For example, if documents include patents, a rule may specify that only breadth scores associated with the broadest independent claim and any dependent claim that depends from the broadest independent claim are utilized to calculate the overall breadth score for the patents using the techniques above (e.g., average, median, etc.). For example, if documents include patents, a rule may specify that only breadth scores associated with independent claims are utilized to calculate the overall breadth score for the patents using the techniques above (e.g., average, median, etc.).

In some examples, comparative breadth scores for the documents are calculated based at least in part on the overall breadth scores. For instance, a comparative breadth score may be calculated for each document being analyzed based on the overall breadth scores of the documents. For example, where the overall breadth score is based on the score of a single document portion (e.g., broadest or narrowest), the calculation compares that score to the score of the corresponding single document portion of other documents that are within the analysis. Where the overall breadth score is based on the score of multiple document portions (e.g., represented as an average; a weighted or unweighted composite of the broadest, average, and range scores; or as individual component scores such as broadest, average, and range), the calculation compares that score or scores to the score or scores of the corresponding multiple document portions of other documents within the analysis. In some instances, the comparative breadth score for a document corresponds to the percentage of documents that include an overall breadth score that is equal to or less than the overall breadth score of the document. In some instances, the comparative breadth score for a document corresponds to the percentage of documents that include an overall breadth score that is less than the overall breadth score of the document. In some instances, the comparative breadth score for a document corresponds to the percentage of documents that include an overall breadth score that is equal to or greater than the overall breadth score of the document. Still, in some instances, the comparative breadth score for a document corresponds to the percentage of documents that include an overall breadth score that is greater than the overall breadth score of the document.

Where the overall breadth score is based on the score of multiple document portions and is maintained as individual component scores such as scores associated with the broadest, average, and range of document portions, calculation may compare each of those scores to the corresponding scores of the multiple document portions of other documents within the analysis. For example, in a context where the documents are patents and the portions are claims, the calculation may compare the breadth score of the broadest claim in a patent to the breadth score of the broadest claims in all patents within the landscape, providing a rank ordering of the patent by broadest claim. The calculation may compare the average breadth of the claims in the patent to the average breadth of the claims in each of the patents within the landscape, providing a rank ordering of the patent by average claim breadth. The calculation may further compare the range of breadth of the claims in the patent to the range of breadth of the claims in each of the patents within the landscape, providing a rank ordering of the patent by range of claim breadth. Then, the calculation may weight the rank order of each component score equally, to determine the final breadth score. Such an approach is based on an assumption that a relatively broad claim is more likely to encompass potentially infringing products, a relatively high average claim breadth reflects that likelihood across a range of independent and dependent claims, and a relatively high range of breadth reflects at least some claims are more likely to encompass limitations that reduce the viability of potential challenges to claim validity.

The model taxonomy component 128 may be configured to generate a model taxonomy of the classification models that have been trained and/or utilized. This model taxonomy may be utilized to show relationships between models and/or to provide search-by-model functionality. Indicators of the model intersection analyses described herein may be included in the model taxonomy and may be utilized for subsequent model analyses. These indicators may include indicators between nodes of the model taxonomy, where each node represents a classification model. Lines or otherwise connectors between nodes may be provided to show which models were utilized to develop document groupings for the technology at issue.

The document analysis platform, as described herein, may be hosted or otherwise utilized by the document analysis system 104 that may be connected to one or more other systems and/or devices, such as the client-side devices 102. The client devices 102 may include the one or more user interfaces 116 described herein and/or may include an application configured to instruct processors 110 of the client devices 102 to display user interfaces 116 as provided by the system 104 associated with the document analysis platform, such as via an application residing on memory 114 of the client devices 102 and/or via an Internet browser. The client devices 102 may receive user input, such as user input from the user interfaces 116, and may provide user input data corresponding to that user input to the system 104 associated with the document analysis platform. The system 104 may utilize that user input data for the various operations described herein.

As described herein, the document analysis platform may be configured to receive user input data associated with classification of given documents. To train the classification models utilizing this user input data, the document analysis platform may perform one or more operations. In some examples, the platform may generate a positive training dataset indicating in class keywords associated with the documents marked in class by a user. For example, the platform may determine one or more keywords associated with a given document that represent the subject matter of that document. This may be performed utilizing one or more document processing techniques, such as term frequency inverse document frequency techniques, for example. The platform may also generate a negative training dataset indicating keywords from the documents marked out of class by the user input. Each of these training datasets may then be utilized to train the classification model such that the classification model is configured to determine whether a given document has keywords that are more similar to the in class keywords than to the out of class keywords. In other examples, instead of or in addition to generating training datasets based on keywords, the platform may determine a vector for a given document. The vector may be associated with a coordinate system and may represent the subject matter of the document in the form of a vector. Vectors may be generated for the documents labeled in class and for the documents labeled out of class. The classification model may be trained to determine whether a vector representation of a given document is closer to the in class vectors than to the out of class vectors in the coordinate system. Techniques to generate vectors representing documents may include vectorization techniques such as Doc2Vec, or other similar techniques.

Additionally, or alternatively, documents representations may include a method that takes a document and turns it into a vector form as a list of floating point numbers based at least in part on the document's text contents. This vector form may be called an embedding. This embedding may be used to calculate distance, and therefore similarity, between documents. These embeddings could be used in association with the classification models in addition to or in replacement of the keyword and/or vectors described above. The embeddings may be utilized to create thematic groups of documents with a set. The set of documents can be some keyword, CPC, owner(s), etc., and the result may be a visual display of document groups (e.g., clusters) that share similar themes. There may be a degree of supervision in the clustering process that may allow for some human control over which documents are grouped in which clusters.

In further examples, the classification models may utilize transfer learning. In these examples, a general-purpose model may be generated and/or received, and each specific classification model may use the general purpose model as a starting point. Rather than having to train a classification model from scratch, the model would be fine-tuned from the general purpose model for whatever that model has not already been trained for with respect to the specific scenario being modeled. These transfer learning techniques may include the user of ULMFit, BERT, ELMo, and T5, among others.

In addition to the techniques for training the classification models described above, the classification models may also be trained and/or organized based at least in part on classifications of the documents. For example, when the documents are patents and patent applications, a predetermined classification system may be established for classifying the subject matter of a given document. The classification system may be determined by the platform, by one or more users, and/or by a third party. For example, patents and patent application may be associated with a predefined classification system such as the CPC system. The CPC system employs CPC codes that correspond to differing subject matter, as described in more detail herein. The CPC codes for a given document may be identified and the categories associated with those codes may be determined. A user interface may be presented to the user that presents the determined categories and allows a user to select which categories the user finds in class for a given purpose. The selected categories may be utilized as a feature for training the classification models. Additionally, or alternatively, the platform may determine the CPC codes for documents marked as in class and may train the classification models to compare those CPC codes with the CPC codes associated with the documents to be analyzed to determine classification.

As shown in FIG. 1, several of the components of the document analysis system 104 and/or the client-side devices 102 and the associated functionality of those components as described herein may be performed by one or more of the other systems and/or by the client-side devices 102. Additionally, or alternatively, some or all of the components and/or functionalities associated with the client-side devices 102 may be performed by the document analysis system 104.

It should be noted that the exchange of data and/or information as described herein may be performed only in situations where a user has provided consent for the exchange of such information. For example, a user may be provided with the opportunity to opt in and/or opt out of data exchanges between devices and/or with the remote systems and/or for performance of the functionalities described herein. Additionally, when one of the devices is associated with a first user account and another of the devices is associated with a second user account, user consent may be obtained before performing some, any, or all of the operations and/or processes described herein.

As used herein, a processor, such as processor(s) 110 and/or 120, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110 and/or 120 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110 and/or 120 may possess its own local memory, which also may store program components, program data, and/or one or more operating systems.

The memory 114 and/or 124 may include volatile and nonvolatile memory, removable and non-removable media implemented in any method or technology for storage of information, such as computer-readable instructions, data structures, program component, or other data. Such memory 114 and/or 124 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114 and/or 124 may be implemented as computer-readable storage media ("CRSM"), which may be any available physical media accessible by the processor(s) 110 and/or 120 to execute instructions stored on the memory 114 and/or 124. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114 and/or 124, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 112 and/or 122 may enable messages between the components and/or devices shown in system 100 and/or with one or more other remote systems, as well as other networked devices. Such network interface(s) 112 and/or 122 may include one or more network interface controllers (NICs) or other types of transceiver devices to send and receive messages over the network 108.

For instance, each of the network interface(s) 112 and/or 122 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 112 and/or 122 may include a wide area network (WAN) component to enable message over a wide area network.

In some instances, the document analysis system 104 may be local to an environment associated the electronic device 102. For instance, the document analysis system 104 may be located within the electronic device 102. In some instances, some or all of the functionality of the document analysis system 104 may be performed by the electronic device 102.

Also, while various components of the document analysis system 104 have been labeled and named in this disclosure and each component has been described as being configured to cause the processor(s) to perform certain operations, it should be understood that the described operations may be performed by some or all of the components and/or other components not specifically illustrated.

Figure 2:
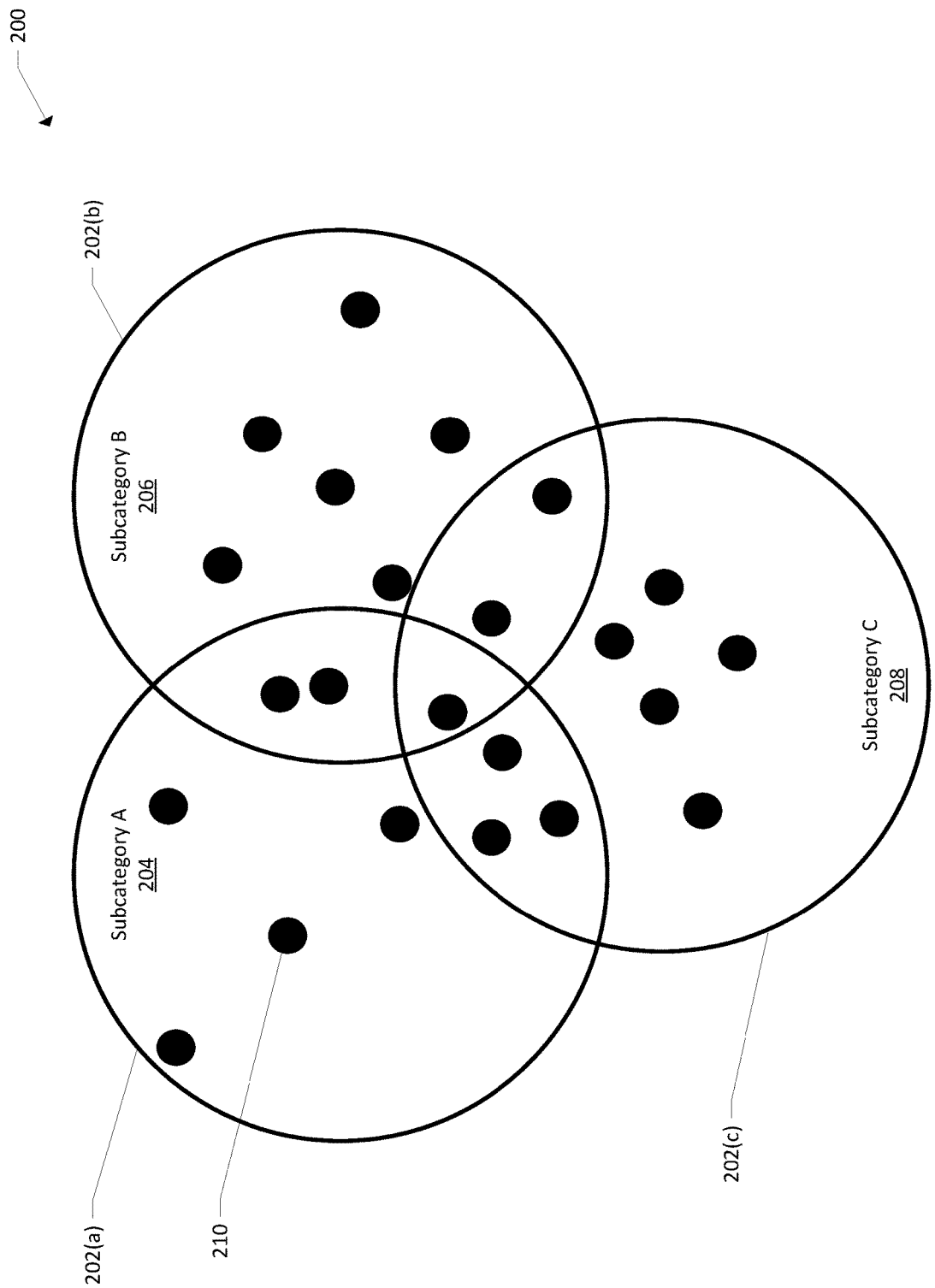
FIG. 2 illustrates a conceptual diagram of document representations and model representations.

FIG. 2 illustrates a conceptual diagram 200 of document representations and model representations. The diagram 200 is described by way of example as a Venn diagram, but it should be understood that other representations of models and documents is also included in this disclosure. The diagram 200 may include two or more model representations 202($a$)-($c$). The model representations 202($a$)-($c$) may represent trained classification models associated with one or more subcategories of an identified technology. The training of these classification models is described in more detail elsewhere herein.

Each of the model representations 202($a$)-($c$) may be associated with a given subcategory. As shown in FIG. 2, model representation 202($a$) is associated with Subcategory A 204, model representation 202($b$) is associated with Subcategory B 206, and model representation 202($c$) is associated with Subcategory C 208. Each of these subcategories may be associated with an identified technology. As shown in FIG. 2, each model representation 202($a$)-($c$) is illustrated as a circle, however it should be understood that other visualizations of the model representations 202($a$)-($c$) are included in this disclosure. It should also be understood that while FIG. 2 shows an example where three models are utilized, this disclosure includes the use of two, three, or more models to determine model intersections.

The diagram 200 may also include document representations 210. These document representations 210 may be positioned relative to the model representations 202($a$)-($c$) based on whether one or more of the trained classification models have determined documents corresponding to the document representations 210 to be in class. Utilizing FIG. 2 as an example, for the trained classification model associated with Subcategory A 204, the model predicted that 10 documents from a sample document set were in class by at least a threshold confidence value. For the trained classification model associated with Subcategory B 206, the model predicted that 11 documents from the sample document set were in class by at least a threshold confidence value. For the trained classification model associated with Subcategory C 208, the model predicted that 11 documents from the sample document set were in class by at least a threshold confidence value.

Utilizing the intersection component described herein, documents that are predicted to be in class for more than one of the trained classification models may be determined. Again utilizing FIG. 2 as an example, a first group of documents that includes any document predicted to be in class by at least one of the classification models may be identified. In this example, all 32 documents represented in FIG. 2 may be included in this first group of documents. A second group of documents that includes any document predicted to be in class by at least two of the classification models may be identified. Here, that second group may include those documents predicted as in class by Subcategory A 204 and Subcategory B 206, and also those documents predicted as in class by Subcategory A 204 and Subcategory C 208, and also those documents predicted as in class by Subcategory B 206 and Subcategory C 208. This second group includes 8 of the 32 documents. Also a third group of documents that includes any document predicted to be in class by all of the classification models may be identified. Here, that third group may include the 1 document predicted as in class by all three of the trained classification models. These various groupings of documents may be identified by the intersection component as described herein.

Figure 3:
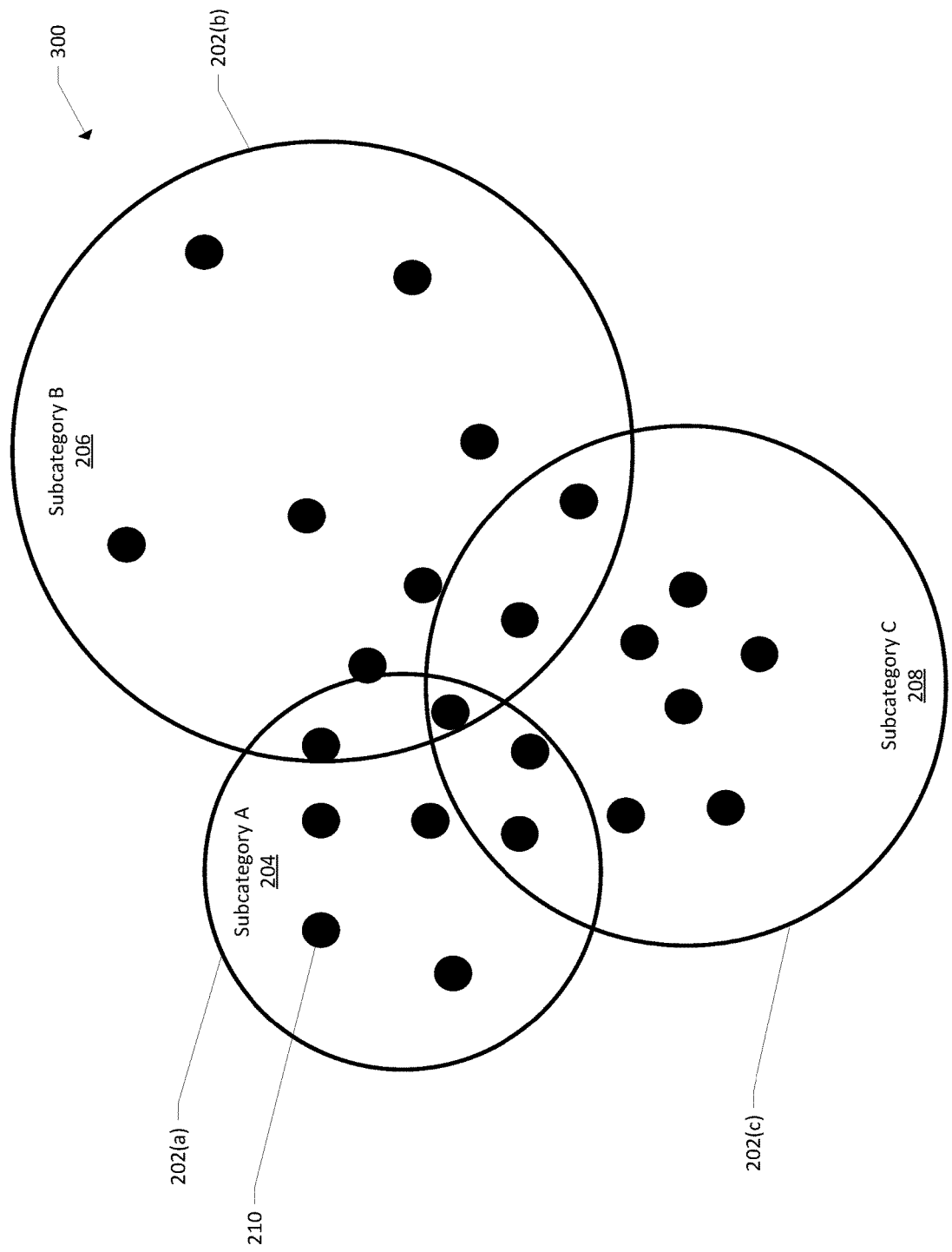
FIG. 3 illustrates a conceptual diagram of model representations having different confidence value thresholds.

FIG. 3 illustrates a conceptual diagram 300 of model representations having different confidence value thresholds. The diagram 300 is described by way of example as a Venn diagram, but it should be understood that other representations of models and documents is also included in this disclosure. The diagram 300 may include two or more model representations 202(a)-(c). The model representations 202(a)-(c) may represent trained classification models associated with one or more subcategories of an identified technology. The training of these classification models is described in more detail elsewhere herein.

Each of the model representations 202(a)-(c) may be associated with a given subcategory. As shown in FIG. 3, model representation 202(a) is associated with Subcategory A 204, model representation 202(b) is associated with Subcategory B 206, and model representation 202(c) is associated with Subcategory C 208. Each of these subcategories may be associated with an identified technology. As shown in FIG. 2, each model representation 202(a)-(c) is illustrated as a circle, however it should be understood that other visualizations of the model representations 202(a)-(c) are included in this disclosure.

The diagram 200 may also include document representations 210. These document representations 210 may be positioned relative to the model representations 202(a)-(c) based on whether one or more of the trained classification models have determined documents corresponding to the document representations 210 to be in class. Utilizing FIG. 3 as an example, for the trained classification model associated with Subcategory A 204, the model predicted that 8 documents from a sample document set were in class by at least a first threshold confidence value. For the trained classification model associated with Subcategory B 206, the model predicted that 11 documents from the sample document set were in class by at least a second threshold confidence value. For the trained classification model associated with Subcategory C 208, the model predicted that 11 documents from the sample document set were in class by at least a third threshold confidence value.

Utilizing the intersection component described herein, the document groupings may be determined as described with respect to FIG. 2. Additionally, the confidence component described herein may be utilized to adjust a confidence score threshold associated with one or more of the trained classification models. Using FIG. 3 as an example, Subcategory A 204 may be associated with a higher confidence score threshold than Subcategory B 206 and Subcategory C 208. This is illustrated by a circle having a smaller radius than the other circles in the diagram 300. Subcategory B 206 may have a lower confidence score threshold than Subcategory A 204 and Subcategory C 208. This is illustrated by a circle having a larger radius than the other circles in the diagram 300. Subcategory C 208 may have a confidence score threshold that is lower than Subcategory A 204 but more than Subcategory B 206. This is illustrated by a circle having a radius that is greater than the circle for Subcategory A 204 but smaller than the circle for Subcategory C 208. A user of the document analysis platform, and/or the platform itself may adjust the confidence score thresholds, which may cause certain documents to be included and/or excluded from the groupings described herein. By allowing the thresholds for each of the models to be adjusted individually, documents that are more or less relevant to a given subcategory may be identified.

Figure 4:
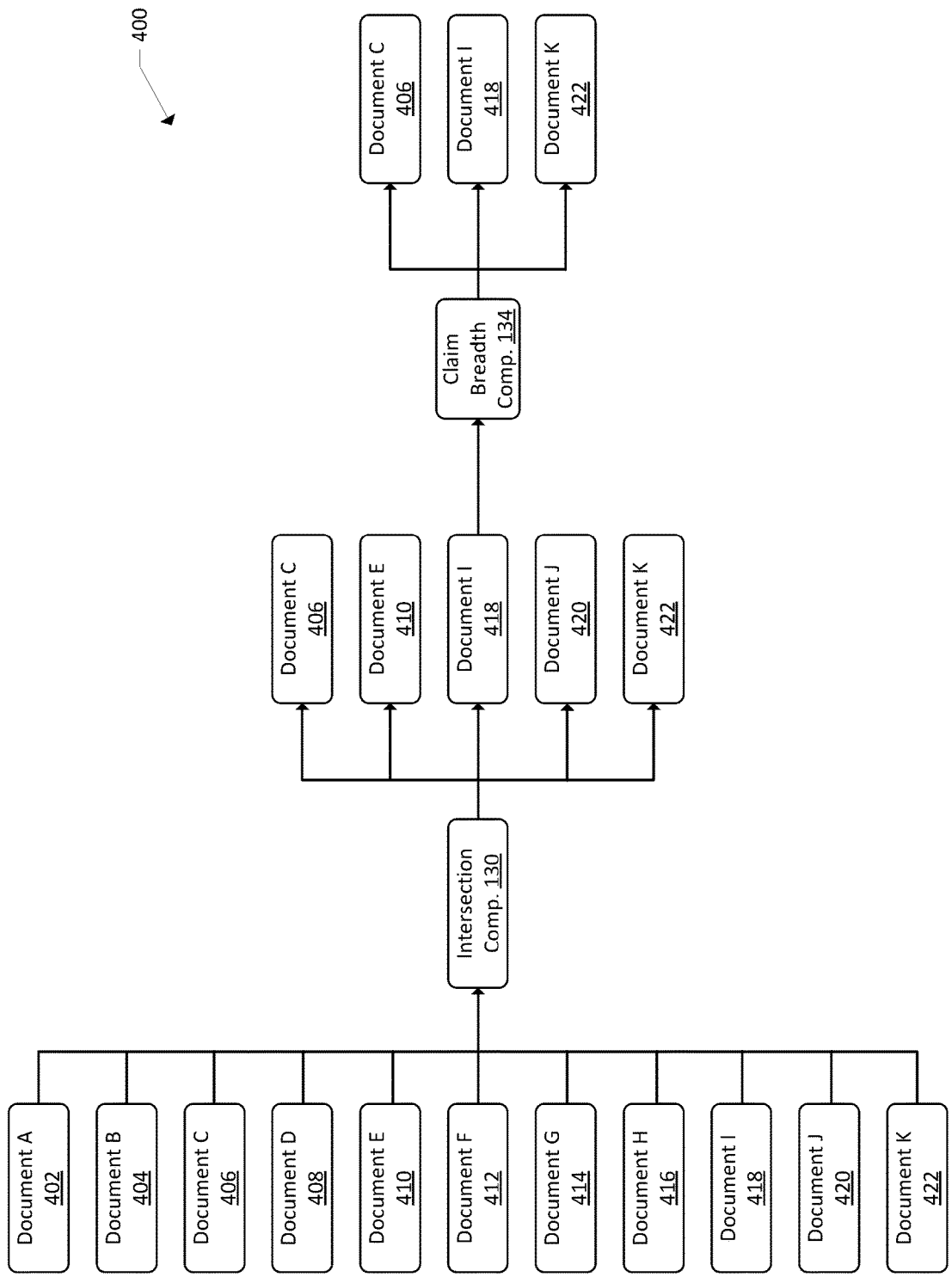
FIG. 4 illustrates a conceptual diagram of components utilized for document analysis by model intersections and utilizing claim breadth scoring.

FIG. 4 illustrates a conceptual diagram 400 of components utilized for document analysis by model intersections and utilizing claim breadth scoring. The diagram 400 includes document representations 402-422, corresponding to Documents A-K. These documents may represent a sample document set to be analyzed by the document analysis platform described herein. As illustrated in more detail above, a model builder component may build and/or train classification models to predict whether documents in the sample document set are in class for a given model.

The intersection component 130 may be configured to determine which of the documents are predicted as in class for different groupings of intersections between the classification models. The intersection component 130 may be configured to identify subcategories of a given technology and/or to receive user input indicating the subcategories. The subcategories may represent a portion of the identified technology. Utilizing this methodology, a first classification model may be trained utilizing a positive and/or negative training dataset for a first subcategory of the identified technology, and a second classification model may be trained utilizing a positive and/or negative training dataset for a second subcategory of the identified technology. Additional models for additional subcategories of the identified technology may also be trained. Thereafter, each of the classification models may be utilized to determine, by the intersection component 130, subsets of documents that are in class for each of the models. Take for example a sample document set of 10,000 documents to be analyzed to determine which of those documents are in class with respect to an identified technology with three subcategories. A first classification model for a first subcategory may identify 500 of the 10,000 documents that are in class with respect to the first subcategory; a second classification model for a second subcategory may identify 750 of the 10,000 documents that are in class with respect to the second subcategory; and a third classification model for a third subcategory may identify 400 of the 10,000 documents that are in class with respect to the third subcategory.

Utilizing the model intersection component 130, differing groups of the documents identified as in class may be generated as results. For example, a first group may include any document that is identified as in class by at least one of the classification models. A second group may include any document that is identified as in class by at least two of the classification models. A third group may include any document that is identified as in class by each of the classification models. As will be appreciated from the example provided above, for the first group, the number of in class documents will be more than the second group, and the number of in class documents in the second group will be more than the third group. In this way, the third group of documents indicated to be in class by each of the classification models represent those documents in the sample group of documents that are relevant to each subcategory of the identified technology. The results of these model intersection analyses may be provided to a computing device, such as the client-side device, associated with the search query. For example, the in class documents in some or all of the groupings may be displayed to a user of the computing device, and/or identified of the documents and/or the groupings may be provided.

As shown in FIG. 4, the result of operations performed utilizing the intersection component 130 is a subset of the sample documents, particularly Document C 406, Document E 410, Document I 418, Document J 420, and Document K 422. Thereafter, the claim breadth component 134 may be configured to determine one or more additional factors of the documents, and to utilize those factors to emphasize some or all of the documents in the subset. By way of example, one factor to be applied may be a claim breadth score, particularly in instances where the documents in question represent patents and/or patent applications. As will be described more fully herein, a claims section of the documents may be analyzed to determine a breadth of the claims, with documents having broad claims receiving a more favorable score and documents having narrow claims receiving a less favorable score. Additional factors other than claim breadth may be analyzed and applied as well to score documents. In these examples, the model intersection analyses described herein may be utilized to identify the groupings of documents described herein. Thereafter, the resulting documents may be analyzed for the one or more additional factors to determine which of those documents should be identified as responsive to a given search query and/or which of those document should be highlighted or otherwise emphasized. The example result of this process, as shown in FIG. 4, is that the subset of documents is further paired down, here to Document C 406, Document I 418, and Document K 422.

Figure 5:
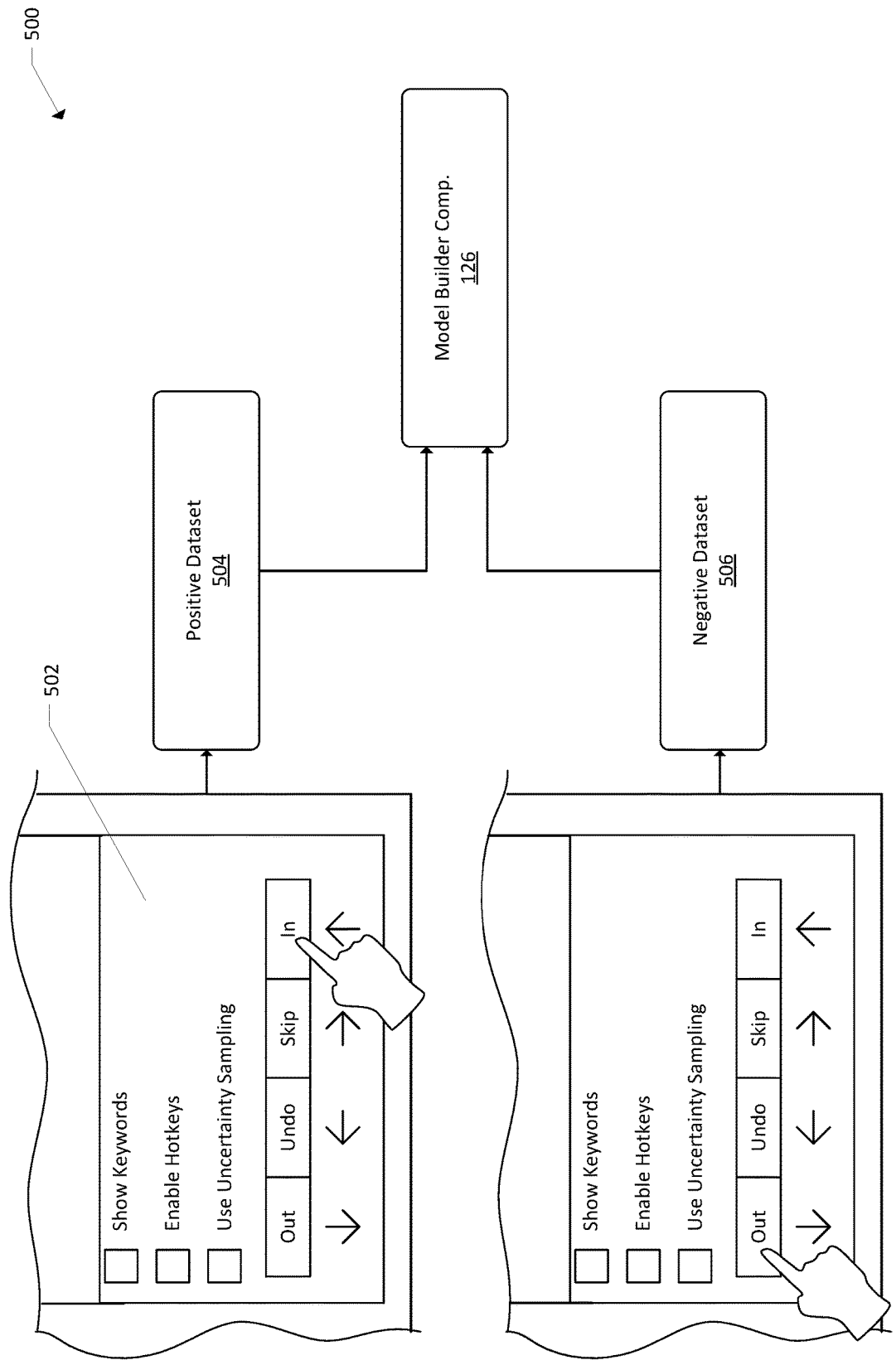
FIG. 5 illustrates a conceptual diagram of user interfaces and components utilized for training models for document analysis.

FIG. 5 illustrates a conceptual diagram of user interfaces and components utilized for training models for document analysis. FIG. 5 illustrates a progression, from left to right and top to bottom, of information displayed on and/or interactions with one or more user interfaces.

In examples, a full document user interface may include information about documents being reviewed by a user, such as the document title, publication number, abstract, claims, and category notes such as the number of documents marked in class and out of class, the number of documents skipped, the number of documents that have been labeled, and analysis details of the document. The user interface may provide additional information regarding some or all of the aspects of a given document. For example, additional portions of the abstract and/or additional claims and/or claim language may be displayed. Additionally, the category progress information and analysis details may be displayed in a category notes window. The analysis details may include the prediction made with respect to the document, such as whether a classification model determined that the document was in class or out of class, a confidence value associated with that determination, and a claim score associated with the claims of the document.

In addition to the above, the user interface may provide a voting window 502 that may allow a user to provide user input indicating whether the document should be labeled as relevant or otherwise "in class" or irrelevant or otherwise "out of class." Additional options may include "skip" and "undo" for example. The voting window 502 may also be utilized to present one or more of the keywords to enable "hotkeys" or otherwise shortcut keys to allow for the user input via a keyboard or similar device as opposed to a mouse scrolling and clicking one of the options, and an option to utilize uncertainty sampling. For example, a user may view the information about the document in the user interface. After review of some or all of the information being displayed, the user may determine that the document is either in class or out of class (or determine that the document is to be skipped). In examples where the document is to be labeled as in class, the user may utilize one or more input means to select a portion of the screen corresponding to the "in" option. In examples where the document is to be labeled as out of class, the user may utilize one or more input means to select a portion of the screen corresponding to the "out" option. Alternatively, when hotkeys are enabled, the user may select the corresponding hotkey on a keyboard (whether physical or digital). Upon selection of one of the options in the voting window 502, the user interface may be caused to display the next unlabeled document in the document set to allow the user to review that document and provide user input associated with the classification of that document.

As shown in FIG. 5, when a user selects the "in" portion of the user interface and/or otherwise indicates that the given document is in class, that document and/or a feature and/or attribute of that document may be saved to a positive dataset 504. For example, when the models utilize keywords for document comparison as described herein, keywords associated with the document labeled "in" may be stored in association with the positive dataset 504, along with additional information such as weighting values associated with the keywords and/or confidence values associated with the determination of the keywords. In examples where the models utilize vectors for document comparison as described herein, a vector associated with the document labeled "in" may be stored in association with the positive dataset 504, along with additional information such as weighting values and/or confidence values. Additional documents where the user indicates that the documents are in class may also be stored in association with the positive dataset 504.

When a user selects the "out" portion of the user interface and/or otherwise indicates that the given document is out of class, that document and/or a feature and/or attribute of that document may be saved to a negative dataset 506. For example, when the models utilize keywords for document comparison as described herein, keywords associated with the document labeled "out" may be stored in association with the negative dataset 506, along with additional information such as weighting values associated with the keywords and/or confidence values associated with the determination of the keywords. In examples where the models utilize vectors for document comparison as described herein, a vector associated with the document labeled "out" may be stored in association with the negative dataset 506, along with additional information such as weighting values and/or confidence values. Additional documents where the user indicates that the documents are out of class may also be stored in association with the negative dataset 506.

As described more fully herein, the classification model may be trained utilizing the labeled documents. For example, the datasets 504, 506 may be utilized to train the classification model how to identify, for the documents that have not been labeled, whether a given document is in class or out of class. To do so, the datasets 504, 506 may be utilized by the model builder component 126 to train the classification model to compare in class and out of class keywords with keywords representative of a sample document, and/or to compare in class and out of class vectors with a vector representative of the sample document.

Figure 6:
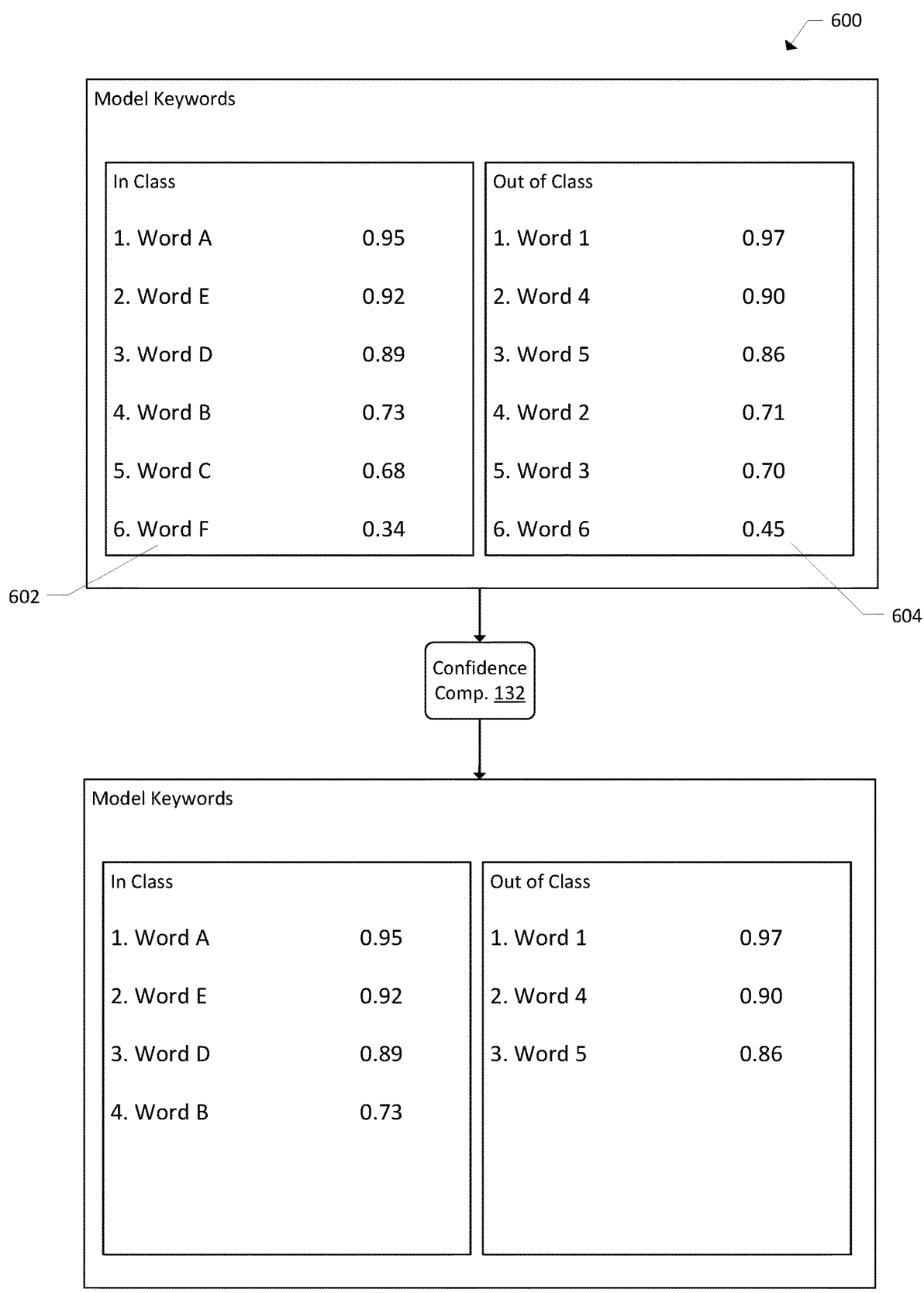
FIG. 6 illustrates a conceptual diagram of user interfaces showing keywords associated with trained models.

FIG. 6 illustrates a conceptual diagram of user interfaces 600 showing keywords associated with trained models.

The user interface 600 may provide a visual indication of the keywords that a given classification model has determined to be included as in class and those keywords that the model has determined to be excluded as out of class. For example, as described more fully elsewhere herein, the models may utilize training datasets indicating which documents are labeled in class and which documents are labeled out of class. Features of those documents may be identified that represent the documents, and those features may be utilized to train the models. In examples, the features may include keywords that represent the text of the document. The presentation of these keywords in the user interface 600 may take one or more forms, such as a list as illustrated in FIG. 6. Other forms may include a word cloud, where the size, font, emphasis, and spacing of the keywords from each other may indicate the relative importance of a given keyword to the included and excluded groupings. For example, the user interface 600 may include an included keyword window 602 and an excluded keyword window 604. The included keyword window 602 may provide a visual indication of the keywords that the model has determined are representative of the documents labeled as in class. The excluded keyword window 604 may provide a visual indication of the keywords that the model has determined are representative of the documents labeled as out of class. The keywords may each be associated with a different weighting value or otherwise may be more or less important for determining document classification. A visual indication of these weighting values may be provided in the included keyword window 602 and the excluded keyword window 604. For example, a keyword located in the center of the word cloud with larger, darker, more emphasized font than other keywords may be the most relevant keyword to the grouping. As shown in FIG. 6, the example lists illustrate that the keyword "Word A" is most important for determining relevant documents while keyword "Word 1" is most important for determining out of class documents. In the list view, an indication of the importance and/or a confidence value associated with the keyword being included in a given window may be displayed. This may provide the user with an indication of not just the ranking of the keywords, but how important those keywords have been determined by the classification model.

In examples, the user interface 600 may be configured to receive user input associated with the keywords. For example, the user input may include a user confirming that a keyword should be included in one or more of the included keyword window 602 and the excluded keyword window 604. The user input may also include a user indicating that a given keyword should be removed, deemphasized, or emphasized more than it currently is. User input data corresponding to the user input may be utilized to retrain the classification model. Additionally, a user may provide user input indicating that a word that is not included in a given window should be included, and the classification model may be retrained based at least in part on that user input data.

Additionally, as shown in FIG. 6, user input may be utilized by the confidence component 132 to determine whether a confidence score threshold is to be adjusted with respect to a given model. By way of example, user input data may indicate that the confidence score threshold is to be increased, which may result in fewer keywords being identified in the positive dataset and in the negative dataset. In this example, the user was able to provide input indicating that Word C and Word F should not be included in the representative words for the positive training dataset and that Word 2, Word 3, and Word 6 should not be included in the representative words for the negative training dataset. This change may impact which documents are identified as in class for given models, and/or which of those documents is identified by the intersection component as being in class with respect to two or more of the models.

Figure 7:
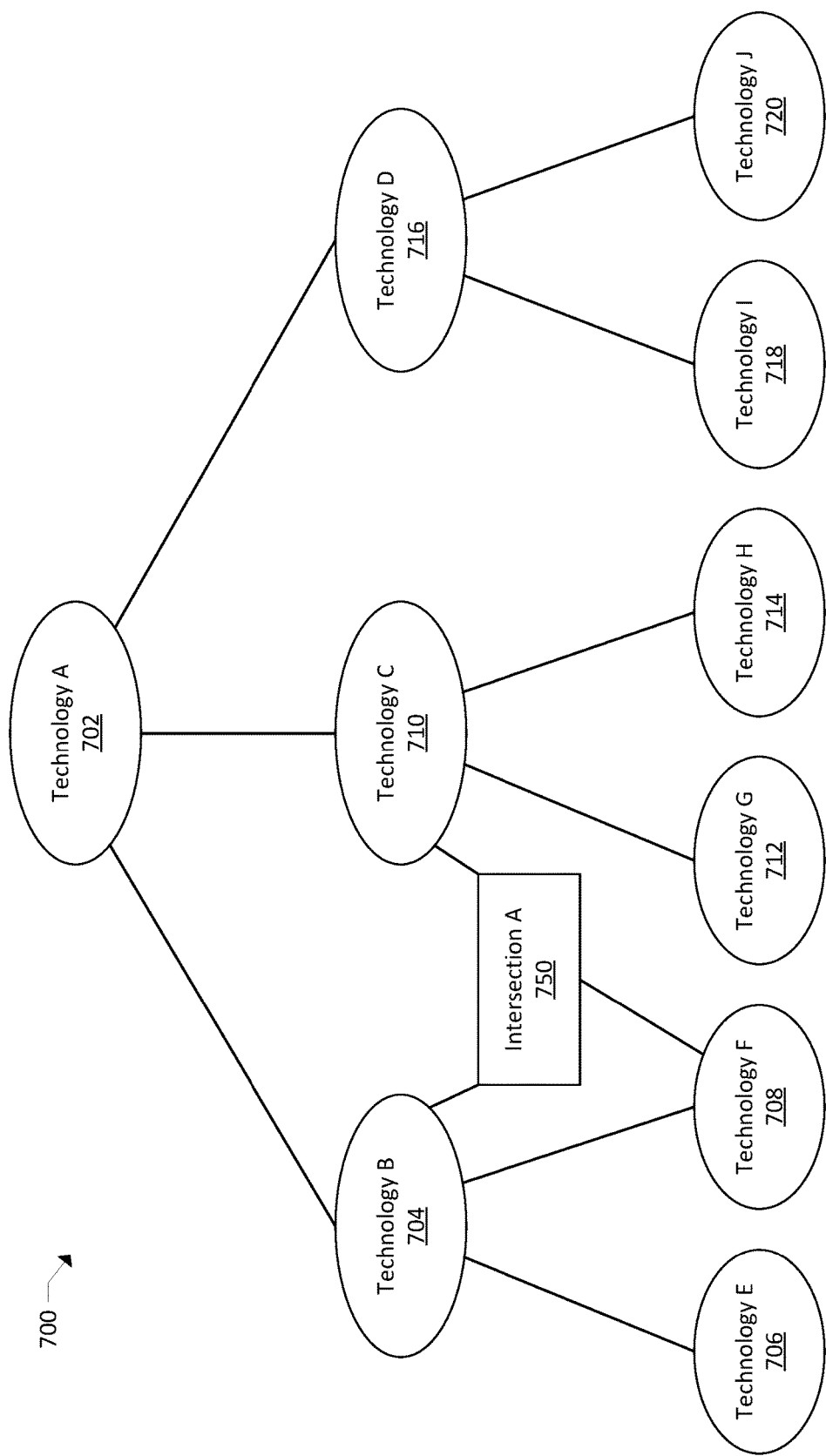
FIG. 7 illustrates a conceptual diagram of a model taxonomy.

FIG. 7 illustrates a conceptual diagram of a model taxonomy. For example, in addition to the training of classification models as described above, once the classification models are trained such that the models are determined to accurately predict classification as trained, the models may be placed in a model taxonomy 700. The model taxonomy 700 may represent a taxonomy tree or otherwise a model hierarchy indicating relationships between models and/or a level of specificity associated with the models. For example, as shown in FIG. 7, a first model 702 associated with determining whether documents are in class with respect to "Technology A," may be associated with other models 704, 710, 716 trained to determine whether documents are in class with respect to "Technology B," "Technology C," and "Technology D," respectively. Each of these models may also be associated with other models 706, 708, 712, 714, 718, 720 trained to determine more specific aspects of these components. This taxonomy 700 may be searchable and may provide functionality that allows a user to provide a search query for a model. The keywords from the search query may be utilized to identify models that may be applicable to the search query and/or to highlight "branches" of the taxonomy associated with the search query.

As shown in FIG. 7, the models in the model taxonomy 700 may be linked to each other in one or more ways. For example, when the subject matter of one model is related to the subject matter of another model, those models may be linked in the taxonomy 700. In some examples, the nodes of the taxonomy representing the models may be determined utilizing a predefined subject matter classification system, such as the CPC system described herein.

Additionally, the model taxonomy 700 may include one or more indicators of model intersections as described herein. For example, Intersection A 750 may represent an intersection indicator for two of more of the models. As illustrated in FIG. 7, Intersection A 750 marks an intersection between Technology B 704, Technology C 710, and Technology F 708. The indicator may be selectable, such as in a search-by-model example, and sample documents may be analyzed by the associated models. The intersection component may utilize the results of that analysis to determine model intersections where documents are predicted to be in class by multiple models.

Figure 8:
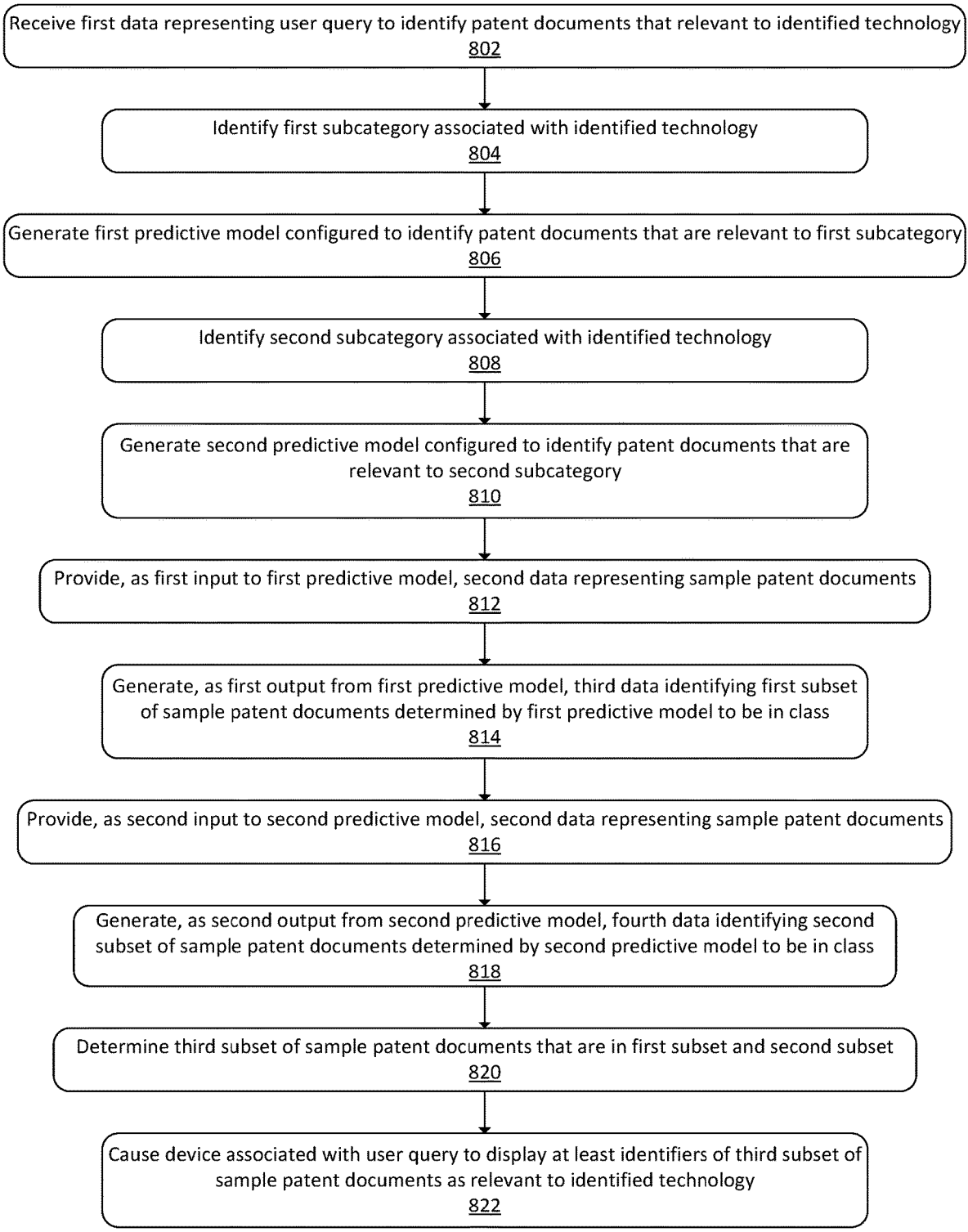
FIG. 8 illustrates a flow diagram of an example process utilized for document analysis using model intersections.
Figure 9:
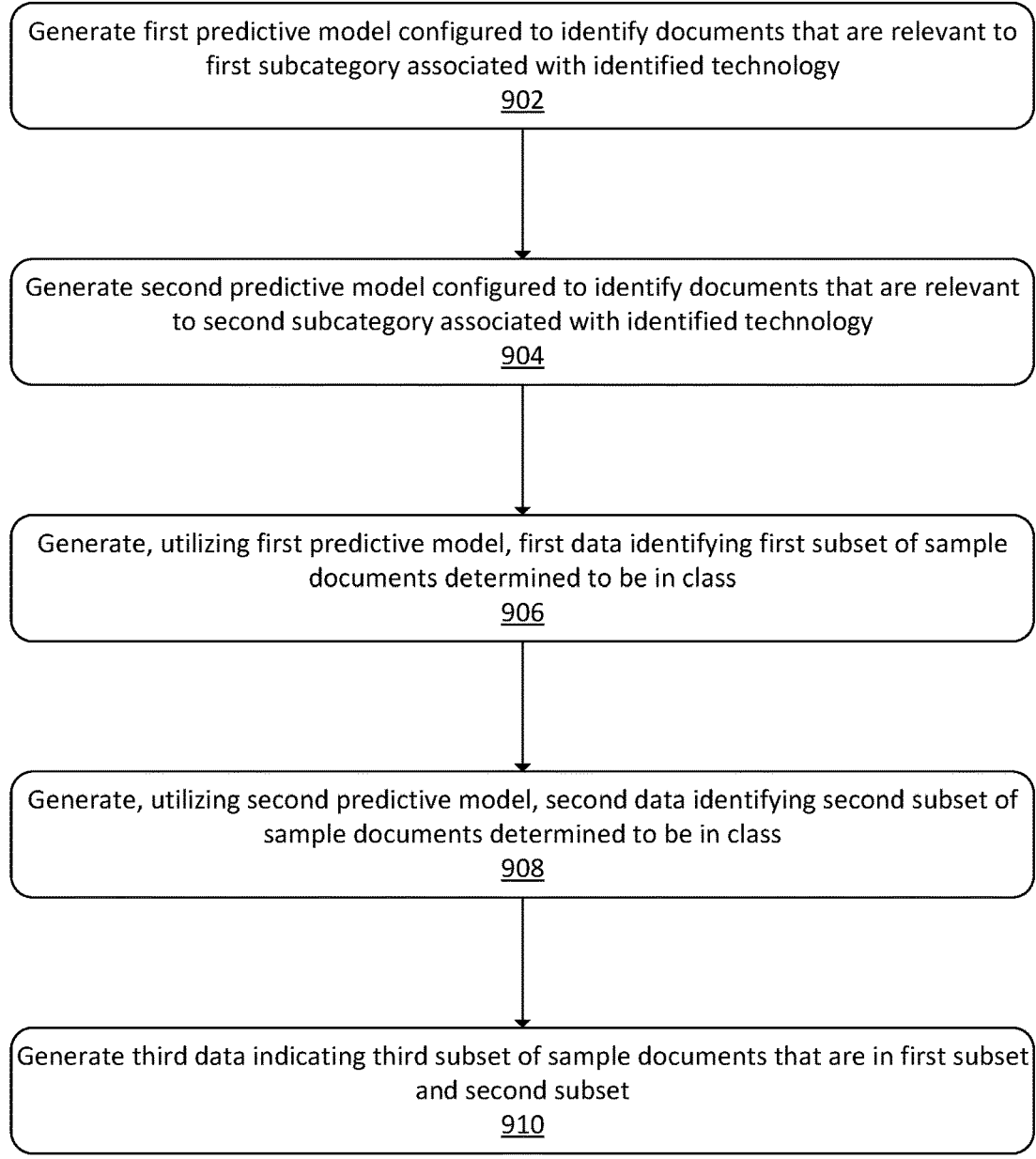
FIG. 9 illustrates a flow diagram of another example process utilized for document analysis using model intersections.

FIGS. 8 and 9 illustrate processes associated with document analysis using model intersections. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-7, although the processes may be implemented in a wide variety of other environments, architectures and systems.

FIG. 8 illustrates a flow diagram of an example process 800 utilized for document analysis using model intersections. The order in which the operations or steps are described is not intended to be construed as a limitation, and any number of the described operations may be combined in any order and/or in parallel to implement process 800. The operations described with respect to the process 800 are described as being performed by a client device, and/or a system associated with the document analysis platform. However, it should be understood that some or all of these operations may be performed by some or all of components, devices, and/or systems described herein.

At block 802, the process 800 may include receiving first data representing a user query to identify patent documents that are relevant to an identified technology. For example, a search query may be received to identify a set of documents that are relevant to that search query. The search query may include one or more keywords and/or phrases that define what is relevant to the search query. Utilizing the document analysis platform described herein, a set of documents with keywords that correspond to the search query may be identified.

At block 804, the process 800 may include identifying a first subcategory associated with the identified technology. For example, the system may utilize the keywords from the identified technology to determine that some of those keywords are associated with a subcategory that may stand as an individual component of the identified technology. In other examples, user input data may indicate a given subcategory associated with the identified technology.

At block 806, the process 800 may include generating a first predictive model configured to identify the patent documents that are relevant to the first subcategory. For example, one or more document classification models may be built and/or trained utilizing user input indicating whether given documents are in class or out of class. As described more fully herein, a user may utilize a user interface to view all or a portion of given documents and select elements on the user interface to identify the given documents as in class or out of class. Once a threshold number of documents have been marked as in class or out of class by a user, one or more classification models may be trained based on a positive training dataset of the documents marked as in class, and in some examples a negative training dataset of the documents marked as out of class. Thereafter, the trained classifications models may be utilized to predict which documents in the balance of the set of documents are in class or out of class.

At block 808, the process 800 may include identifying a second subcategory associated with the identified technology. Identifying the second subcategory may be performed in the same or a similar manner as identifying the first subcategory as described with respect to block 804.

At block 810, the process 800 may include generating a second predictive model configured to identify the patent documents that are relevant to the second subcategory. Generating the second predictive model may be performed in the same or a similar manner as generating the first predictive model as described with respect to block 806.

At block 812, the process 800 may include providing, as first input to the first predictive model, second data representing sample patent documents. For example, a document database, such as from a third-party system and/or from a device associated with the user query, may be queried for sample documents that are responsive to keywords from the user query.

At block 814, the process 800 may include generating, as first output from the first predictive model, third data identifying a first subset of the sample patent documents determined by the first predictive model to be in class. For example, the models may be configured to determine whether a given document has keywords that are more similar to the in class keywords than to the out of class keywords. In other examples, instead of or in addition to generating training datasets based on keywords, the platform may determine a vector for a given document. The vector may be associated with a coordinate system and may represent the subject matter of the document in the form of a vector. Vectors may be generated for the documents labeled in class and for the documents labeled out of class. The classification model may be trained to determine whether a vector representation of a given document is closer to the in class vectors than to the out of class vectors in the coordinate system. Techniques to generate vectors representing documents may include vectorization techniques such as Doc2Vec, or other similar techniques.

Additionally, or alternatively, documents representations may include a method that takes a document and turns it into a vector form as a list of floating point numbers based at least in part on the document's text contents. This vector form may be called an embedding. This embedding may be used to calculate distance, and therefore similarity, between documents. These embeddings could be used in association with the classification models in addition to or in replacement of the keyword and/or vectors described above. The embeddings may be utilized to create thematic groups of documents with a set. The set of documents can be some keyword, CPC, owner(s), etc., and the result may be a visual display of document groups (e.g., clusters) that share similar themes. There may be a degree of supervision in the clustering process that may allow for some human control over which documents are grouped in which clusters.

At block 816, the process 800 may include providing, as second input to the second predictive model, the second data representing the sample patent documents. Providing the second data may be performed in the same or a similar manner as providing the first data as described with respect to block 812.

At block 818, the process 800 may include generating, as second output from the second predictive model, fourth data identifying a second subset of the sample patent documents determined by the second predictive model to be in class. Generating the second subset may be performed in the same or a similar manner to generating the first subset as described with respect to block 814.

At block 820, the process 800 may include determining a third subset of the sample patent documents that are in the first subset and the second subset. Take for example a sample document set of 10,000 documents to be analyzed to determine which of those documents are in class with respect to an identified technology with three subcategories. A first classification model for a first subcategory may identify 500 of the 10,000 documents that are in class with respect to the first subcategory; and a second classification model for a second subcategory may identify 750 of the 10,000 documents that are in class with respect to the second subcategory.

Utilizing the model intersection component, differing groups of the documents identified as in class may be generated as results. For example, a first group may include any document that is identified as in class by at least one of the classification models. A second group may include any document that is identified as in class by at least two of the classification models. A third group may include any document that is identified as in class by each of the classification models, particularly where three models are utilized. As will be appreciated from the example provided above, for the first group, the number of in class documents will be more than the second group, and the number of in class documents in the second group will be more than the third group. In this way, the third group of documents indicated to be in class by each of the classification models represent those documents in the sample group of documents that are relevant to each subcategory of the identified technology.

At block 822, the process 800 may include causing a device associated with the user query to display at least identifiers of the third subset of the sample patent documents as relevant to the identified technology. For example, the results of these model intersection analyses may be provided to a computing device, such as a client-side device, associated with the user query. For example, the in class documents in some or all of the groupings may be displayed to a user of the computing device, and/or identification of the documents and/or the groupings may be provided.

Additionally, or alternatively, the process 800 may include identifying a third subcategory associated with the identified technology. The process 800 may also include generating a third predictive model configured to identify the patent documents that are relevant to the third subcategory. The process 800 may also include generating, as output from the third predictive model, fifth data identifying a fourth subset of the sample patent documents determined by the third predictive model to be in class. In these examples, the third subset includes the sample patent documents that: are in the first subset, the second subset, and the fourth subset; or are in at least two of the first subset, the second subset, and the fourth subset.

Additionally, or alternatively, the process 800 may include determining a first confidence threshold to apply to the first predictive model, the first confidence threshold indicating a first degree of confidence for predicting a given patent document as in class. The process 800 may also include determining a second confidence threshold to apply to the second predictive model, the second confidence threshold indicating a second degree of confidence for predicting the given patent document as in class, wherein the first confidence threshold differs from the second confidence threshold. In these examples, generating the third data is based at least in part on the first confidence threshold; and generating the fourth data is based at least in part on the second confidence threshold.

Additionally, or alternatively, the process 800 may include determining a claim breadth value indicating a claim breadth of claims of the individual ones of the sample patent documents in the third subset. The process 800 may also include determining a fourth subset of the sample patent documents that are in the third subset and have a claim breadth value that satisfies a threshold claim breadth value. The process 800 may also include causing the device to prioritize display of identifiers for the fourth subset of the sample patent documents.

FIG. 9 illustrates a flow diagram of another example process 900 utilized for document analysis using model intersections. The order in which the operations or steps are described is not intended to be construed as a limitation, and any number of the described operations may be combined in any order and/or in parallel to implement process 900. The operations described with respect to the process 900 are described as being performed by a client device, and/or a system associated with the document analysis platform. However, it should be understood that some or all of these operations may be performed by some or all of components, devices, and/or systems described herein.

At block 902, the process 900 may include generating a first predictive model configured to identify documents that are relevant to a first subcategory associated with an identified technology. For example, the system may utilize keywords from an identified technology to determine that some of those keywords are associated with a subcategory that may stand as an individual component of the identified technology. In other examples, user input data may indicate a given subcategory associated with the identified technology. Then, one or more document classification models may be built and/or trained utilizing user input indicating whether given documents are in class or out of class. As described more fully herein, a user may utilize a user interface to view all or a portion of given documents and select elements on the user interface to identify the given documents as in class or out of class. Once a threshold number of documents have been marked as in class or out of class by a user, one or more classification models may be trained based on a positive training dataset of the documents marked as in class, and in some examples a negative training dataset of the documents marked as out of class. Thereafter, the trained classifications models may be utilized to predict which documents in the balance of the set of documents are in class or out of class.

At block 904, the process 900 may include generating a second predictive model configured to identify the documents that are relevant to a second subcategory associated with the identified technology. Generating the second predictive model may be performed in the same or a similar manner as generating the first predictive model as described with respect to block 902.

At block 906, the process 900 may include generating, utilizing the first predictive model, first data identifying a first subset of sample documents determined to be in class. For example, the models may be configured to determine whether a given document has keywords that are more similar to the in class keywords than to the out of class keywords. In other examples, instead of or in addition to generating training datasets based on keywords, the platform may determine a vector for a given document. The vector may be associated with a coordinate system and may represent the subject matter of the document in the form of a vector. Vectors may be generated for the documents labeled in class and for the documents labeled out of class. The classification model may be trained to determine whether a vector representation of a given document is closer to the in class vectors than to the out of class vectors in the coordinate system. Techniques to generate vectors representing documents may include vectorization techniques such as Doc2Vec, or other similar techniques.

Additionally, or alternatively, documents representations may include a method that takes a document and turns it into a vector form as a list of floating point numbers based at least in part on the document's text contents. This vector form may be called an embedding. This embedding may be used to calculate distance, and therefore similarity, between documents. These embeddings could be used in association with the classification models in addition to or in replacement of the keyword and/or vectors described above. The embeddings may be utilized to create thematic groups of documents with a set. The set of documents can be some keyword, CPC, owner(s), etc., and the result may be a visual display of document groups (e.g., clusters) that share similar themes. There may be a degree of supervision in the clustering process that may allow for some human control over which documents are grouped in which clusters.

At block 908, the process 900 may include generating, utilizing the second predictive model, second data identifying a second subset of the sample documents determined to be in class. Generating the second data may be performed in the same or a similar manner as generating the first data described with respect to block 906.

At block 910, the process 900 may include generating third data indicating a third subset of the sample documents that are in the first subset and the second subset. Take for example a sample document set of 10,000 documents to be analyzed to determine which of those documents are in class with respect to an identified technology with three subcategories. A first classification model for a first subcategory may identify 500 of the 10,000 documents that are in class with respect to the first subcategory; and a second classification model for a second subcategory may identify 750 of the 10,000 documents that are in class with respect to the second subcategory.

Utilizing the model intersection component, differing groups of the documents identified as in class may be generated as results. For example, a first group may include any document that is identified as in class by at least one of the classification models. A second group may include any document that is identified as in class by at least two of the classification models. A third group may include any document that is identified as in class by each of the classification models, particularly where three models are utilized. As will be appreciated from the example provided above, for the first group, the number of in class documents will be more than the second group, and the number of in class documents in the second group will be more than the third group. In this way, the third group of documents indicated to be in class by each of the classification models represent those documents in the sample group of documents that are relevant to each subcategory of the identified technology.

Additionally, or alternatively, the process 900 may include generating a third predictive model configured to identify the documents that are relevant to a third subcategory associated with the identified technology. The process 900 may also include generating, utilizing the third predictive model, fourth data identifying a fourth subset of the sample documents determined to be in class. In these examples, the third subset includes the sample documents that are in the first subset, the second subset, and the fourth subset.

Additionally, or alternatively, the process 900 may include determining a first confidence threshold to apply to the first predictive model. The process 900 may also include determining a second confidence threshold to apply to the second predictive model, the first confidence threshold differing from the second confidence threshold. In these examples, generating the first data is based at least in part on the first confidence threshold and generating the second data is based at least in part on the second confidence threshold.

Additionally, or alternatively, the process 900 may include determining, for individual ones of the sample documents, a claim score for claims of the individual ones of the sample documents. The process 900 may also include determining a fourth subset of the sample documents that are in the third subset and have a claim score that satisfies a threshold claim score.

Additionally, or alternatively, the process 900 may include generating a user interface configured to display keywords from documents predicted as in class by the first predictive model utilizing the first confidence threshold. The process 900 may also include receiving user input data indicating a second confidence threshold to apply to the first predictive model, the user input data in response to the keywords as displayed via the user interface. The process 900 may also include applying the second confidence threshold to the first predictive model instead of the first confidence threshold.

Additionally, or alternatively, the process 900 may include generating first vectors representing the documents associated with the third subset in a coordinate system. The process 900 may also include determining an area of the coordinate system associated with the first vectors. The process 900 may also include identifying additional documents represented by second vectors in the coordinate system that are within the area.

Additionally, or alternatively, the process 900 may include generating a third predictive model configured to identify the documents that are relevant to a third subcategory associated with the identified technology. The process 900 may also include generating, utilizing the third predictive model, fourth data identifying a fourth subset of the sample documents determined to be in class. In these examples, the third subset includes the sample documents that are in at least one of: the first subset and the second subset; the second subset and the fourth subset; or the first subset and the fourth subset.

Additionally, or alternatively, the process 900 may include storing a model hierarchy of predictive models including the first predictive model and the second predictive model, the model hierarchy indicating relationships between the predictive models. The process 900 may also include generating an indicator that in-class prediction of documents for the identified technology is performed utilizing the first predictive model and the second predictive model. The process 900 may also include receiving a search query for a model to utilize from the model hierarchy and determining that the search query corresponds to the identified technology. The process 900 may also include providing response data to the search query representing the indicator instead of the first predictive model and the second predictive model.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:
1. A method comprising:
  receiving first data representing a user query to identify patent documents that are relevant to an identified technology;
  identifying a first subcategory associated with the identified technology;
  generating a first predictive model trained utilizing transfer learning techniques and configured to identify the patent documents that are relevant to the first subcategory;
  identifying a second subcategory associated with the identified technology;

generating a second predictive model trained utilizing the transfer learning techniques and configured to identify the patent documents that are relevant to the second subcategory;

providing, as first input to the first predictive model, second data representing sample patent documents;

generating, as first output from the first predictive model, third data identifying a first subset of the sample patent documents determined by the first predictive model to be in class;

providing, as second input to the second predictive model, the second data representing the sample patent documents;

generating, as second output from the second predictive model, fourth data identifying a second subset of the sample patent documents determined by the second predictive model to be in class;

determining a third subset of the sample patent documents that are in the first subset and the second subset;

generating a node for a model taxonomy, wherein the node corresponds to the third subset of the sample patent documents;

associating, based at least in part on the third subset of the sample patent documents, a location of the node within the model taxonomy such that the node is indicated as being related to the first predictive model and the second predictive model;

causing a device associated with the user query to render a user interface with at least identifiers of the third subset of the sample patent documents as relevant to the identified technology, wherein the first predictive model is associated with a first confidence threshold indicating a first degree of confidence for predicting a given patent document as in class;

generating a user interface configured to display keywords from documents predicted as in class by the first predictive model utilizing the first confidence threshold; and receiving user input data indicating a second confidence threshold to apply to the first predictive model, the user input data in response to the keywords as displayed via the user interface.

2. The method of claim 1, further comprising:
identifying a third subcategory associated with the identified technology;
generating a third predictive model configured to identify the patent documents that are relevant to the third subcategory;
generating, as output from the third predictive model, fifth data identifying a fourth subset of the sample patent documents determined by the third predictive model to be in class; and
wherein the third subset includes the sample patent documents that:
are in the first subset, the second subset, and the fourth subset; or
are in at least two of the first subset, the second subset, and the fourth subset.

3. The method of claim 1, further comprising:
determining a first confidence threshold to apply to the first predictive model, the first confidence threshold indicating a first degree of confidence for predicting a given patent document as in class;
determining a second confidence threshold to apply to the second predictive model, the second confidence threshold indicating a second degree of confidence for predicting the given patent document as in class, wherein the first confidence threshold differs from the second confidence threshold; and
wherein:
generating the third data is based at least in part on the first confidence threshold; and
generating the fourth data is based at least in part on the second confidence threshold.

4. The method of claim 1, further comprising:
determining a claim breadth value indicating a claim breadth of claims of individual ones of the sample patent documents in the third subset;
determining a fourth subset of the sample patent documents that are in the third subset and have a claim breadth value that satisfies a threshold claim breadth value; and
causing the device to prioritize display of identifiers for the fourth subset of the sample patent documents.

5. A system, comprising:
one or more processors; and
non-transitory computer-readable media storing computer-executable instructions that, when executed by the one or more processors, cause the one or more processors to perform operations comprising:
generating a first predictive model trained utilizing transfer learning techniques and configured to identify documents that are relevant to a first subcategory associated with an identified technology;
generating a second predictive model trained utilizing transfer learning techniques and configured to identify the documents that are relevant to a second subcategory associated with the identified technology;
generating, utilizing the first predictive model, first data identifying a first subset of sample documents determined to be in class;
generating, utilizing the second predictive model, second data identifying a second subset of the sample documents determined to be in class;
generating third data indicating a third subset of sample documents that are in the first subset and the second subset;
generating a node for a model taxonomy, wherein the node corresponds to the third subset of sample documents;
associating, based at least in part on the third subset of sample documents, a location of the node within the model taxonomy such that the node is indicated as being related to the first predictive model and the second predictive model, wherein the first predictive model is associated with a first confidence threshold indicating a first degree of confidence for predicting a given patent document as in class;
generating a user interface configured to display keywords from documents predicted as in class by the first predictive model utilizing the first confidence threshold; and
receiving user input data indicating a second confidence threshold to apply to the first predictive model, the user input data in response to the keywords as displayed via the user interface.

6. The system of claim 5, the operations further comprising:
generating a third predictive model configured to identify the documents that are relevant to a third subcategory associated with the identified technology;

generating, utilizing the third predictive model, fourth data identifying a fourth subset of the sample documents determined to be in class; and wherein the third subset includes the sample documents that are in the first subset, the second subset, and the fourth subset.

7. The system of claim 5, the operations further comprising:

determining a first confidence threshold to apply to the first predictive model;

determining a second confidence threshold to apply to the second predictive model, the first confidence threshold differing from the second confidence threshold; and wherein:
generating the first data is based at least in part on the first confidence threshold; and
generating the second data is based at least in part on the second confidence threshold.

8. The system of claim 5, the operations further comprising:

determining, for individual ones of the sample documents, a claim score for claims of the individual ones of the sample documents; and determining a fourth subset of the sample documents that are in the third subset and have a claim score that satisfies a threshold claim score.

9. The system of claim 5, the operations further comprising:

applying the second confidence threshold to the first predictive model instead of the first confidence threshold.

10. The system of claim 5, the operations further comprising:

generating first vectors representing the documents associated with the third subset in a coordinate system;

determining an area of the coordinate system associated with the first vectors; and identifying additional documents represented by second vectors in the coordinate system that are within the area.

11. The system of claim 5, the operations further comprising:

generating a third predictive model configured to identify the documents that are relevant to a third subcategory associated with the identified technology;

generating, utilizing the third predictive model, fourth data identifying a fourth subset of the sample documents determined to be in class; and wherein the third subset includes the sample documents that are in at least one of:
the first subset and the second subset;
the second subset and the fourth subset; or
the first subset and the fourth subset.

12. The system of claim 5, the operations further comprising:

storing a model hierarchy of predictive models including the first predictive model and the second predictive model, the model hierarchy indicating relationships between the predictive models;

generating an indicator that in-class prediction of documents for the identified technology is performed utilizing the first predictive model and the second predictive model;

receiving a search query for a model to utilize from the model hierarchy;

determining that the search query corresponds to the identified technology; and providing response data to the search query representing the indicator instead of the first predictive model and the second predictive model.

13. A method, comprising:

generating a first predictive model trained utilizing transfer learning techniques and configured to identify documents that are relevant to a first subcategory associated with an identified technology;

generating a second predictive model trained utilizing transfer learning techniques and configured to identify the documents that are relevant to a second subcategory associated with the identified technology;

generating, utilizing the first predictive model, first data identifying a first subset of sample documents determined to be in class;

generating, utilizing the second predictive model, second data identifying a second subset of sample documents determined to be in class;

generating third data indicating a third subset of sample documents that are in the first subset and the second subset;

generating a node for a model taxonomy, wherein the node corresponds to the third subset of sample documents;

associating, based at least in part on the third subset of sample documents, a location of the node within the model taxonomy such that the node is indicated as being related to the first predictive model and the second predictive model, wherein the first predictive model is associated with a first confidence threshold indicating a first degree of confidence for predicting a given patent document as in class;

generating a user interface configured to display keywords from documents predicted as in class by the first predictive model utilizing the first confidence threshold; and receiving user input data indicating a second confidence threshold to apply to the first predictive model, the user input data in response to the keywords as displayed via the user interface.

14. The method of claim 13, further comprising:

generating a third predictive model configured to identify the documents that are relevant to a third subcategory associated with the identified technology;

generating, utilizing the third predictive model, fourth data identifying a fourth subset of sample documents determined to be in class; and wherein the third subset includes sample documents that are in the first subset, the second subset, and the fourth subset.

15. The method of claim 13, further comprising:

determining a first confidence threshold to apply to the first predictive model;

determining a second confidence threshold to apply to the second predictive model, the first confidence threshold differing from the second confidence threshold; and wherein:
generating the first data is based at least in part on the first confidence threshold; and
generating the second data is based at least in part on the second confidence threshold.

16. The method of claim 13, further comprising:

determining, for individual ones of the sample documents, a claim score for claims of the individual ones of the sample documents; and determining a fourth subset of the sample documents that are in the third subset and have a claim score that satisfies a threshold claim score.

17. The method of claim 13, further comprising:
applying the second confidence threshold to the first predictive model instead of the first confidence threshold.

18. The method of claim 13, further comprising:
generating first vectors representing the documents associated with the third subset in a coordinate system;
determining an area of the coordinate system associated with the first vectors; and
identifying additional documents represented by second vectors in the coordinate system that are within the area.

19. The method of claim 13, further comprising:
generating a third predictive model configured to identify the documents that are relevant to a third subcategory associated with the identified technology;
generating, utilizing the third predictive model, fourth data identifying a fourth subset of the sample documents determined to be in class; and
wherein the third subset includes the sample documents that are in at least one of:
the first subset and the second subset;
the second subset and the fourth subset; or
the first subset and the fourth subset.

20. The method of claim 13, further comprising:
storing a model hierarchy of predictive models including the first predictive model and the second predictive model, the model hierarchy indicating relationships between the predictive models;
generating an indicator that in-class prediction of documents for the identified technology is performed utilizing the first predictive model and the second predictive model;
receiving a search query for a model to utilize from the model hierarchy;
determining that the search query corresponds to the identified technology; and
providing response data to the search query representing the indicator instead of the first predictive model and the second predictive model.

* * * * *